United States Patent
Roberts et al.

(10) Patent No.: US 7,482,085 B2
(45) Date of Patent: Jan. 27, 2009

(54) APPARATUS FOR IMPROVING THE COLD STARTING CAPABILITY OF AN ELECTROCHEMICAL FUEL CELL

(75) Inventors: Joy A Roberts, Coquitlam (CA); Jean St-Pierre, Vancouver (CA); Marian E van der Geest, Vancouver (CA); Abderrahmane Atbi, Vancouver (CA); Nicholas J Fletcher, Rio De Janeiro (BR)

(73) Assignee: BDF IP Holdings Ltd., Vancouver, BC (CA)

( * ) Notice: Subject to any disclaimer, the term of this patent is extended or adjusted under 35 U.S.C. 154(b) by 707 days.

(21) Appl. No.: 10/833,228

(22) Filed: Apr. 26, 2004

(65) Prior Publication Data

US 2005/0112418 A1    May 26, 2005

Related U.S. Application Data

(63) Continuation-in-part of application No. 09/819,875, filed on Mar. 28, 2001, now abandoned, which is a continuation-in-part of application No. 09/406,318, filed on Sep. 27, 1999, now Pat. No. 6,479,177, which is a continuation-in-part of application No. 09/138,625, filed on Aug. 24, 1998, now abandoned, which is a continuation of application No. 08/659,921, filed on Jun. 7, 1996, now Pat. No. 5,798,186.

(51) Int. Cl.
*H01M 8/04* (2006.01)
(52) U.S. Cl. .......................................... 429/34; 429/17
(58) Field of Classification Search ................ 429/34, 429/17
See application file for complete search history.

(56) References Cited

U.S. PATENT DOCUMENTS 3,507,702 A    4/1970    Sanderson (Continued)

FOREIGN PATENT DOCUMENTS

DE    197 57 318    2/1999

(Continued)

OTHER PUBLICATIONS

Adlhart, "Environmental Testing of SPE Fuel Cell Assemblies", *Proceedings of the 29th Power Sources Conference*, pp. 1-2.

(Continued)

*Primary Examiner*—Mark Ruthkosky
(74) *Attorney, Agent, or Firm*—Seed IP Law Group PLLC

(57) ABSTRACT

An electric power generation system has elements that improve the cold start capability and freeze tolerance of a constituent fuel cell stack cooperate to reduce the amount of water remaining within the passages of the stack. The system includes a purge system that is connectable to the oxidant supply, fuel supply and/or coolant passages upstream of the stack. When the stack is shut down, the stack is disconnected from an external circuit, and purge fluid is transmitted by the purge system through the stack before the stack falls below the freezing point of water. In systems where fuel and/or oxidant streams are humidified prior to entry into the stack, a humidifier bypass system may be provided in place of the purge system. The humidifier bypass system transmits reactant fluid to the stack in fluid isolation from the humidifier, so that the inlet reactant streams are unhumidified.

7 Claims, 15 Drawing Sheets

U.S. PATENT DOCUMENTS

| | | | |
|---|---|---|---|
| 4,729,932 A | 3/1988 | McElroy | |
| 5,021,303 A | 6/1991 | Donado | 429/16 |
| 5,041,344 A | 8/1991 | Kamoshita et al. | |
| 5,082,753 A | 1/1992 | Shimizu et al. | |
| 5,084,144 A | 1/1992 | Reddy et al. | |
| 5,200,278 A | 4/1993 | Watkins et al. | |
| 5,230,966 A | 7/1993 | Voss et al. | |
| 5,262,249 A | 11/1993 | Beal et al. | |
| 5,366,818 A | 11/1994 | Wilkinson et al. | |
| 5,432,020 A | 7/1995 | Fleck | 429/13 |
| 5,478,662 A | 12/1995 | Strasser | |
| 5,482,790 A | 1/1996 | Yamada et al. | |
| 5,503,944 A | 4/1996 | Meyer et al. | |
| 5,648,182 A | 7/1997 | Hara et al. | |
| 5,789,092 A | 8/1998 | Spiers et al. | |
| 5,798,186 A | 8/1998 | Fletcher | |
| 6,068,941 A | 5/2000 | Fuller et al. | |
| 6,103,410 A | 8/2000 | Fuller et al. | |
| 6,106,964 A * | 8/2000 | Voss et al. | 429/20 |
| 6,329,089 B1 | 12/2001 | Roberts et al. | 429/13 |
| 6,416,895 B1 | 7/2002 | Voss et al. | |
| 6,479,177 B1 | 11/2002 | Roberts et al. | |
| 2002/0164509 A1 | 11/2002 | Wheat et al. | |

FOREIGN PATENT DOCUMENTS

| | | |
|---|---|---|
| DE | 199 28 068 | 8/2002 |
| EP | 0 595 503 A1 | 5/1994 |
| EP | 0 878 860 | 11/1998 |
| EP | 1 006 601 A2 | 6/2000 |
| EP | 1 061 600 | 12/2000 |
| GB | 1296831 | 11/1972 |
| JP | 59-073854 | 4/1984 |
| JP | 60-138855 | 7/1985 |
| JP | 61-045569 | 3/1986 |
| JP | 3081970 A | 4/1991 |
| JP | 05-047394 * | 2/1993 |
| JP | 405047394 * | 2/1993 |
| JP | 06-223855 | 8/1994 |
| JP | 6-223855 | 8/1994 |
| JP | 6215786 A | 8/1994 |
| JP | 7094202 A | 4/1995 |
| JP | 7272737 A | 10/1995 |
| JP | 11-273704 | 10/1999 |
| JP | 2000-315514 | 11/2000 |
| JP | 2000-324617 | 11/2000 |
| JP | 2003-031245 | 1/2003 |
| JP | 2003-178778 | 6/2003 |
| WO | WO 95/18469 | 7/1995 |
| WO | WO 97/48142 | 12/1997 |
| WO | WO 00/30200 | 5/2000 |
| WO | WO 00/65676 | 11/2000 |
| WO | WO 01/03215 A1 | 1/2001 |
| WO | WO 01/03217 A1 | 1/2001 |

OTHER PUBLICATIONS

Rieke et al., "Temperature Dependence of Water Content and Proton Conductivity in Polyperfluorosul-fonic Acid Membranes", *Journal of Membrane Science*, vol. 32, pp. 313-328.

Tasaka et al., "Freezing and Nonfreezing Water In Charged Membranes", *Journal of Membrane Science*, vol. 38, pp. 175-183.

Bernardi, "Water-Balance Calculations for Solid-Polymer-Electrolyte Fuel Cells", *J. Electrochem. Soc.*, vol. 137, No. 11, pp. 3344-3350.

Yoshida et al., "Behavior of water in perfluorinated ionomer membranes containing various monovalent cations", *Journal of Membrane Science*, vol. 68, pp. 1-10.

Chen et al. "Studies of Water in Nafion Membranes Using Deuteron and Oxygen-17 Nuclear Magnetic Resonance, and Dielectric Relaxation Techniques", *J. Electrochem. Soc.*, vol. 140, No. 4, pp. 889-895.

Holleck, "Near-Ambient Solid Polymer Fuel Cell", Final Report, EIC Laboratories, Inc., Norwood, MA (submitted to NASA Headquarters, Washington, DC).

Wilson et al., "Endurance Testing of Low Pt Loading Polymer Electrolyte Fuel Cells", *Proceeding of the Electrochemical Society*, vol. 94, No. 23, pp. 145-157.

Simpson et al., "Factors Affecting the Performance of Proton Exchange Membrane Fuel Cells", *Proceedings of the First International Symposium on Proton Conducting Membrane Fuel Cells I*, vol. 95-23, pp. 182-192.

Sen et al., "Determination of Water Content and Resistivity of Perfluorosulfonic Acid Fuel Cell Membranes", *Mat. Res. Soc. Symp. Proc.* vol. 393, pp. 157-162.

Cappadonia et al., "Conductance of Nafion 117 membranes as a function of temperature and water content", *Solid State Ionics*, vol. 77, pp. 65-69.

Grot et al., "Evaluation of the Humidification Requirements of New Proton Exchange Membranes for Fuel Cells", *Mat. Res. Soc. Symp. Proc.* vol. 393, pp. 163-168.

St-Pierre et al., "Advanced Water Management Techniques for Solid Polymer Fuel Cells", *Modern Battery Sys. II*, pp. 318-329.

Buchi et al., "Operating Proton Exchange Membrane Fuel Cells Without External Humidification of the Reactant Gases", *J. Electrochem. Soc.*, vol. 144, No. 8, pp. 2767-2772.

Van Bussel et al., "Dynamic Model of Solid Polymer Fuel Cell Water Management", *J. Power Sources*, vol. 71, pp. 218-222.

Watanabe et al., "Analysis of Self-Humidification and Suppression of Gas Crossover in Pt-Dispersed Polymer Electrolyte Membranes for Fuel Cells", *J. Electrochem. Soc.*, vol. 145, No. 4, pp. 1137-1141.

Srinivasan et al., "High Energy Density Proton Exchange Membrane Fuel Cell with Dry Reactant Gases", Center for Electrochemical Systems and Hydrogen Research, Texas A&M University System, pp. 513-516.

* cited by examiner

APPARATUS FOR IMPROVING THE COLD STARTING CAPABILITY OF AN ELECTROCHEMICAL FUEL CELL

CROSS-REFERENCE TO RELATED APPLICATION(S)

This application is a continuation-in-part of U.S. patent application Ser. No. 09/819,875 filed Mar. 28, 2001, entitled "Apparatus for Improving the Cold Starting Capability of an Electrochemical Fuel Cell". The '875 application is a continuation-in-part of U.S. patent application Ser. No. 09/406,318 filed Sep. 27, 1999, now U.S. Pat. No. 6,479,177 issued Nov. 12, 2002, entitled "Methods for Improving the Cold Starting Capability of an Electrochemical Fuel Cell". The '318 application is a continuation-in-part of U.S. patent application Ser. No. 09/138,625 filed Aug. 24, 1998, now abandoned, entitled "Method and Apparatus for Commencing Operation of a Fuel Cell Electric Power Generation System Below the Freezing Temperature of Water". The '625 application is a continuation of U.S. patent application Ser. No. 08/659,921 filed Jun. 7, 1996, now U.S. Pat. No. 5,798,186 issued Aug. 25, 1998, also entitled "Method and Apparatus for Commencing Operation of a Fuel Cell Electric Power Generation System Below the Freezing Temperature of Water".

FIELD OF THE INVENTION

The present invention relates to ways to improve the cold start capability of an electrochemical fuel cell. More particularly, the present invention relates to apparatus for improving the cold start capability of fuel cell electric power generation systems that include a solid polymer fuel cell stack.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit.

the cathode, the oxidant stream moves through the porous cathode substrate and is reduced at the cathode electrocatalyst layer to form a reaction product.

In fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

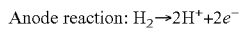

Anode reaction: $H_2 \rightarrow 2H^+ + 2e^-$

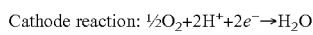

Cathode reaction: $\tfrac{1}{2}O_2 + 2H^+ + 2e^- \rightarrow H_2O$

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell. Separator plates typically do not have flow passages formed in the surfaces thereof, but are used in combination with an adjacent layer of material which provides access passages for the fuel and oxidant to the respective anode and cathode electrocatalyst, and provides passages for the removal of reaction products. The preferred operating temperature range for solid polymer fuel cells is typically 50° C. to 120° C., most typically about 75° C. to 85° C.

Two or more fuel cells can be electrically connected together in series to increase the overall power output of the assembly. In series arrangements, one side of a given fluid flow field or separator plate can serve as an anode plate for one cell and the other side of the fluid flow field or separator plate can serve as the cathode plate for the adjacent cell. Such a multiple fuel cell arrangement is referred to as a fuel cell stack, and is usually held together in its assembled state by tie rods and end plates. The stack typically includes inlet ports and manifolds for directing the fluid fuel stream (such as substantially pure hydrogen, methanol reformate or natural gas reformate, or a methanol-containing stream in a direct methanol fuel cell) and the fluid oxidant stream (such as substantially pure oxygen, oxygen-containing air or oxygen in a carrier gas such as nitrogen) to the individual fuel cell reactant flow passages. The stack also commonly includes an inlet port and manifold for directing a coolant fluid stream, typically water, to interior passages within the stack to absorb heat generated by the fuel cell during operation. The stack also generally includes exhaust manifolds and outlet ports for expelling the depleted reactant streams and the reaction products such as water, as well as an exhaust manifold and outlet port for the coolant stream exiting the stack. In a power generation system various fuel, oxidant and coolant conduits carry these fluid streams to and from the fuel cell stack.

When an electrical load (comprising one or more load elements) is placed in an electrical circuit connecting the electrodes, the fuel and oxidant are consumed in direct proportion to the electrical current drawn by the load, which will vary with the ohmic resistance of the load.

Solid polymer fuel cells generally employ perfluorosulfonic ion exchange membranes, such as those sold by DuPont under its NAFION trade designation and by Dow under the trade designation XUS 13204.10. When employing such membranes, the fuel and oxidant reactant streams are typically humidified before they are introduced to solid polymer fuel cells so as to facilitate proton transport through the ion exchange membrane and to avoid drying (and damaging) the membrane separating the anode and cathode of each cell.

Each reactant stream exiting the fuel cell stack generally contains water. The outlet fuel stream from the anodes generally contains the water added to humidify the incoming fuel stream plus any product water drawn across the membrane from the cathode. The outlet oxidant stream from the cathodes generally contains the water added to humidify the incoming oxidant stream plus product water formed at the cathode.

In some fuel cell applications, such as, for example, motive applications, it may be necessary or desirable to commence operation of a solid polymer electrolyte fuel cell stack when the stack core temperature is below the freezing temperature of water. As used herein, the freezing temperature of water means the freezing temperature of free water, that is, 0° C. at 1 atmosphere. It may also be necessary or desirable when ceasing operation of the solid polymer fuel cell stack to improve the cold start capability and freeze tolerance of the stack by reducing the amount of water remaining within the fuel, oxidant and coolant passages of the stack. Upon freezing, water remaining within stack passages will expand and potentially damage structures within the stack such as, for example, the membrane/electrocatalyst interface, the reactant passageways, conduits and seals, as well as the porous electrode substrate material.

If there is an expectation that a solid polymer fuel cell stack will be subjected to cold temperatures, especially temperatures below the freezing temperature of water, one or more special start-up and shutdown techniques and associated apparatus may be used. These techniques may improve the cold start capability and freeze tolerance of the stack, and improve the subsequent fuel cell performance. A measure of electrochemical fuel cell performance is the voltage output from the cell for a given current density. Higher performance is associated with a higher voltage output for a given current density or higher current density for a given voltage output.

SUMMARY OF THE INVENTION

According to one aspect of the invention, an electric power generation system is provided that includes a fuel cell stack connectable to an external electrical circuit; when so connected, the stack may supply electric current to the external circuit. The stack comprises at least one solid polymer fuel cell and fluid stream passages for directing fluid streams through at least one of the fuel cells. The system also includes a purge system that has a purge conduit having an inlet end connectable to a purge fluid supply, and an outlet end connectable to at least one of the fluid stream passages. The purge system also has a purge flow control device that controls the flow of a pressurized purge fluid through the purge conduit such that water can be purged from at least one of the fluid stream passages after a supply of electric current from the stack to the external circuit has been interrupted. The purge system is operable to improve the cold start capability and freeze tolerance of its fuel cell stacks by reducing the amount of water remaining within the passages of the stack prior to stack freezing.

The fluid stream passages of the stack include passages for oxidant and fuel reactant streams. Any or all of the oxidant and fuel stream passages can connected to the purge conduit upstream of the stack, so that purge fluid can be directed to one or both of the oxidant and fuel passages and through the fuel cell(s). Additionally, a coolant passage may be connected to the purge conduit upstream of the stack to enable purge fluid to be transmitted therethrough.

The purge flow control device controls the purge operation during stack shut-down. A suitable purge flow control device includes a control valve connected to the purge conduit, and a control unit that is communicative with at least the control valve and optionally with one or more additional devices and sensors. In one aspect, the control unit is a microcontroller that is responsive to one or more input signals, and can control one or more devices. Upon receipt of an input signal to shut down the stack, the microcontroller receipt of an input signal to shut down the stack, the microcontroller opens a switch connecting the stack to the external circuit, thereby interrupting the supply of current from the stack to the circuit. Then, the control unit shuts off the reactant flow and opens the purge control valve for a selected period of time.

The purge system may further include a pressure regulator connected to the purge conduit and communicative with the control unit, to enable regulation of the pressure of purge fluid supplied to at least one of the reactant passages.

A suitable purge fluid is an inert gas, such as nitrogen. "Inert" in this sense means a fluid that is substantially non-reactive in the fuel cell.

According to another aspect of the invention, an electric power generation system is provided that has a humidifier bypass system. Such an electric power generation system comprises a fuel cell stack connectable to an external electrical circuit; when connected, the stack may supply electric current to the external circuit. The stack comprises at least one solid polymer fuel cell, reactant stream passages for directing reactant streams through at least one of the fuel cells, a humidifier in fluid communication with at least one of the reactant stream passages for humidifying a reactant stream supplied to the fuel cell stack, and a humidifier bypass system. conduit for transmitting at least one reactant from a reactant supply to the stack in fluid isolation from the humidifier, and a bypass control device for selectively directing flow of the reactant streams to the fuel cell stack through the humidifier or the humidifier bypass conduit. Alternatively, the humidifier bypass system may comprise a humidifier wherein the water transfer rate to a supply reactant stream passing through the humidifier can be reduced or stopped, such as a humidity exchanger or an injection-type humidifier.

In shutdown methods involving a purge with reactant gas which is humidified during normal operation, humidification of the reactant gas may be reduced or stopped. This may be accomplished, for example, by directing the reactant to the stack in fluid isolation from the humidifier, or by reducing the water transfer rate to the supply reactant stream passing through the humidifier.

Each bypass conduit typically includes an inlet end that is connected to one of the reactant stream passages upstream of the humidifier or directly to one of the reactant supplies, and an outlet end that is connected to one of the reactant stream inlet passages downstream of said humidifier and upstream of the stack.

The control device is operable to direct reactant fluid through the humidifier and to the stack during normal operation, i.e. while electrical power is being generated by the stack, and through the bypass conduit and to the stack during a shut down procedure (for example, after supply of electric current from the stack to the external circuit has been interrupted). The control device may include at least one bypass inlet valve connected to one of the reactant passages upstream of the humidifier, and at least one bypass outlet valve connected to the same reactant passage downstream of the humidifier. The bypass conduit connects the bypass inlet and outlet valves so that reactant fluid can be transmitted in fluid isolation from the humidifier directly to the stack. The bypass control device preferably further includes a control unit communicative with the bypass inlet and outlet valves and with an input signal source. The control unit may be a micro-controller or other similar device.

According to another aspect of the invention, there is provided a method of ceasing operation of an electric power generation system to improve the cold start capability and freeze tolerance of fuel cell stacks by reducing the amount of water remaining within the passages of the stack. The stack comprises a fuel cell stack connectable to an external electrical circuit for supplying electric current to the external circuit. The stack comprises at least one fuel cell comprising a membrane electrode assembly comprising an anode, a cathode, and an ion exchange membrane interposed between the anode and the cathode. The at least one fuel cell further comprises a fuel stream passage for directing a fuel stream to the anode and an oxidant stream passage for directing an oxidant stream to the cathode. Each of the streams is flowable to the fuel cell stack. The method comprises the sequential steps of:

(a) interrupting the supply of electric current from the fuel cell stack to the external circuit;

(b) purging water from at least one of the passages.

Although both the oxidant and fuel stream passages may be purged, it has been found that purging of only the oxidant stream passages generally gives satisfactory results. Thus, in a preferred embodiment of the method, the at least one of the passages is the oxidant stream passage. Step (a) preferably further comprises decreasing the flow rate of at least one of the incoming reactant streams.

The purge in step (b) may be performed at a temperature within the normal stack operating temperature range, however it has been found to be advantageous to significantly reduce the temperature of the fuel cell prior to purging one or both of the reactant stream passages. Thus in a preferred embodiment of a method of ceasing operation of an electric power generation system, the method comprises the sequential steps of:

(a) interrupting the supply of electric current from the fuel cell stack to the external circuit;

(b) reducing the temperature of the fuel cell stack to below its normal operating temperature;

(c) purging water from at least one of the passages.

Preferably in step (b) the temperature is reduced to a predetermined temperature threshold below the normal stack operating temperature before the purge is initiated. The threshold is greater than the freezing temperature of water, and preferably at least about 20° C. below the normal stack operating temperature. It is more preferably in the range of about 15° C. to 30° C., and still more preferably less than about 10° C.

The nominal operating temperature of the stack may be measured directly (for example, by locating a temperature sensor at one or more locations within the stack) or indirectly, for example, by monitoring the temperature of one or more of the fluid streams exiting the stack. In practice, measurements such as these may be used to provide or infer a representative or approximate value for the stack operating temperature.

In the above embodiments of a method, preferably the water is purged from the passages by flowing a fluid stream therethrough. The fluid stream may be, for example, an inert liquid or gas (such as nitrogen) or one of the reactant streams. The water carrying capacity of a gas increases with decreasing gas pressure, so if a gas is used to purge the passage preferably the pressure of the gas is not greater than about 30 psig (207 kPa gauge), and is preferably less than about 5 psig (34 kPa gauge). If both the fuel and reactant gases are to be purged simultaneously, preferably the pressure differential across the membrane during the purge is maintained at less than about 10 psi (69 kPa), and preferably less than about 5 psi (35 kPa).

Optionally, the foregoing system further comprises an incoming fuel stream with a fuel stream humidifier for producing a humidified fuel stream from the incoming fuel stream, and/or an incoming oxidant stream with an oxidant stream humidifier for producing a humidified oxidant stream from the incoming oxidant stream. If the fluid stream used to purge the at least one passage is one of the reactant streams, the respective reactant stream is flowed to purge the passage such that the respective humidifier is bypassed.

The fuel cell stack may further comprise a passage for flowing a coolant stream. If the coolant is water or another coolant that may freeze at the anticipated stack storage temperature, a preferred method includes an additional step comprising purging the coolant from the coolant stream passage. The coolant is preferably purged from the coolant stream passage by directing a fluid stream through the coolant stream passage. The fluid stream can be, for example, the incoming oxidant stream or an inert stream such as nitrogen.

The foregoing purge techniques are effective in situations in which the temperature of at least a portion of the membrane electrode assembly is subsequently to be reduced to below the freezing temperature of water.

A first method of commencing operation of an electric power generation system expedites the warming of the fuel cell stack to within its desired operating temperature range. The system comprises a fuel cell stack connectable to an external electrical circuit for supplying electric current to the external circuit. The stack comprises at least one fuel cell, the at least one fuel cell comprising a membrane electrode assembly comprising an anode, a cathode, and an ion exchange membrane interposed between the anode and the cathode. The system further comprises a fuel stream and an oxidant stream, each of the streams being flowable to the fuel cell stack. The system further comprises a coolant fluid stream flowable in thermal contact with the fuel cell stack. The method comprises:

supplying electric current from the fuel cell stack to the external circuit such that the temperature of the at least one fuel cell increases; and flowing the coolant fluid stream in thermal contact with the fuel cell stack only after the operating temperature of the stack exceeds a predetermined temperature threshold.

The nominal operating temperature of the stack may be measured directly (for example, by locating a temperature sensor at one or more locations within the stack) or indirectly, for example, by monitoring the temperature of one or more of the fluid streams exiting the stack. In practice, measurements such as these may be used to provide or infer a representative or approximate value for the stack operating temperature.

The temperature threshold at which flow of coolant is commenced is preferably greater than about 0° C., but may be below the typical desired operating temperature range of the fuel cell stack. For example, the threshold could be in the range of about 30° C. to 50° C., or the threshold may be within the desired operating temperature range, which for a solid polymer fuel cell is typically about 75° C. to 85° C. Once the desired operating temperature range is reached, conventional temperature regulation techniques may be used thereafter to keep the fuel cell stack operating within the desired temperature range.

This method is especially useful for commencing operation when at least a portion of the membrane electrode assembly has a temperature below the freezing temperature of water.

In an improvement upon the foregoing method, the predetermined temperature threshold at which flow of coolant is commenced is higher than the normal desired operating temperature of the stack. For example, it is preferably at least about 10° C. above the normal desired operating temperature of the stack. For a typical solid polymer fuel cell the preferred operating temperature range may be, for example, about 75° C. to 85° C. In this embodiment of the method, flow of coolant could be delayed until the operating temperature reaches a value in the range of about 95° C. to 105° C.

This in situ "heat treatment" of a membrane electrode assembly after a cold start has been shown, in certain situations, to improve subsequent fuel cell performance of a fuel cell, relative to commencing operation without operating the cell above its normal operating temperature range. Again, this improved method is especially useful for commencing operation when at least a portion of the membrane electrode assembly has temperature below the freezing temperature of water, and particularly operation on air (rather than a substantially pure oxidant). Operationally, the in situ heat treatment method can be accomplished in a number of other ways, besides delaying flow of a coolant.

Thus, a second method of commencing operation of an electric power generation system includes a period in which the stack is operated above its normal operating temperature. The system comprises a fuel cell stack connectable to an external electrical circuit for supplying electric current to the external circuit. The stack comprises at least one fuel cell, the at least one fuel cell comprising a membrane electrode assembly comprising an anode, a cathode, and an ion exchange membrane interposed between the anode and the cathode. The system further comprises a fuel stream and an oxidant stream, each of the streams being flowable to the fuel cell stack. The system optionally further comprises a coolant fluid stream flowable in thermal contact with the fuel cell stack. The method comprises:

supplying electric current from the fuel cell stack to the external circuit such that the temperature of the at least one fuel cell increases to a temperature above the normal operating temperature range of the stack; and reducing the operating temperature of the stack to with the normal operating temperature range.

The temperature above the normal operating temperature is typically predetermined. In preferred embodiments of the method, the fuel cell stack is temporarily operated at least about 10° C. above its normal desired operating temperature. For a typical solid polymer fuel cell the preferred operating temperature range may be, for example, about 75° C. to 85° C., so that stack may preferably be operated at a value in the range of about 95° C. to 105° C. for some period before operation in the range about 75° C. to 85° C. is resumed. The duration for which the stack is operated at the higher temperature may be variable, or it may be for a predetermined duration. For example, the stack may be operated at the higher temperature for about 1-2 minutes or for a few seconds. However, either or both of the temperature and duration of the higher temperature operation phase may be adjusted in response to some monitored operational parameter of the fuel cell system. For example, the preferred temperature and/or duration may depend on the temperature of the surrounding environment, the moisture conditions within the stack, a parameter indicative of reactant quality or purity, for how long the stack was stored at a low temperature, or an electrical parameter indicative of fuel cell performance.

As an alternative to the above heat treatment method, there may be some advantages to heating a fuel cell from below the freezing point of water to above its normal operating temperature range prior to commencing operation thereof. For example, an externally powered heater could be used to heat the stack or to heat a coolant circulated through the stack, or a hot fluid stream from elsewhere in the system could be used. Preferably as gas stream is circulated through one or both of the reactant stream passages during the heat treatment.

The methods described above for ceasing and commencing operation of a fuel cell may be used together or separately. In any of the above methods the exothermic operation of the stack tends to raise the operating temperature of the stack. However, other means may be used, in addition, to accelerate or facilitate the increase in temperature to within or beyond the desired stack operating temperature range.

BRIEF DESCRIPTION OF THE DRAWING(S)

DETAILED DESCRIPTION OF PREFERRED EMBODIMENT(S)

Figure 1:
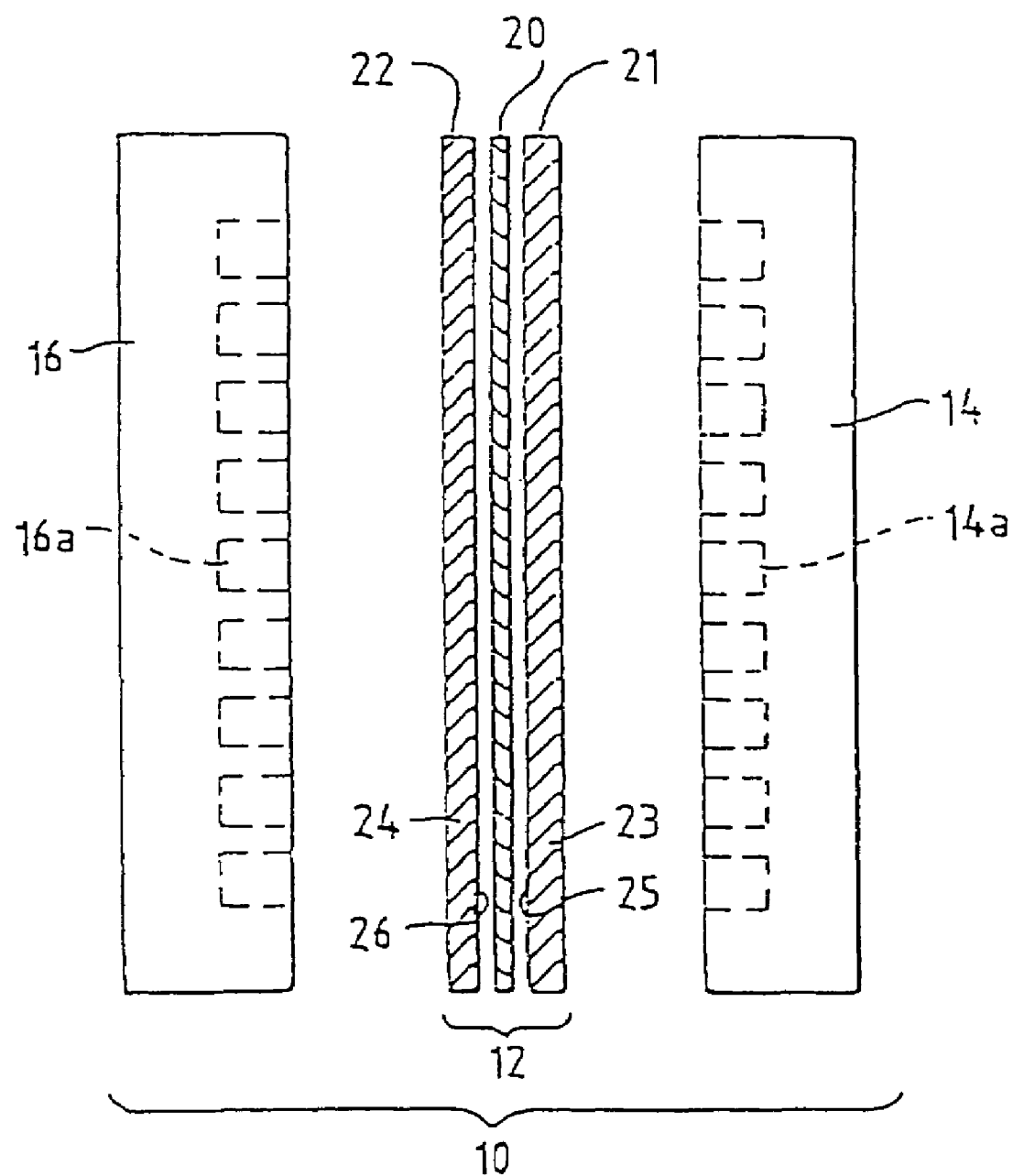
FIG. 1 is an exploded side view of a typical solid polymer electrochemical fuel cell with a membrane electrode assembly interposed between two fluid flow field plates.

FIG. 1 illustrates a typical fuel cell 10. Fuel cell 10 includes a membrane electrode assembly 12 interposed between anode flow field plate 14 and cathode flow field plate 16. Membrane electrode assembly 12 consists of an ion exchange membrane 20 interposed between two electrodes, namely, anode 21 and cathode 22. In conventional fuel cells, anode 21 and cathode 22 comprise a substrate of porous electrically conductive sheet material 23 and 24, respectively, for example, carbon fiber paper or carbon cloth. Each substrate has a thin layer of electrocatalyst 25 and 26, respectively, disposed on one surface thereof at the interface with membrane 20 to render each electrode electrochemically active.

As further shown in FIG. 1, anode flow field plate 14 has at least one fuel flow channel 14a formed in its surface facing anode 21. Similarly, cathode separator plate 16 has at least one oxidant flow channel 16a formed in its surface facing cathode 22. When assembled against the cooperating surfaces of electrodes 21 and 22, channels 14a and 16a form the reactant flow field passages for the fuel and oxidant, respectively. The flow field plates are electrically conductive.

Figure 2:
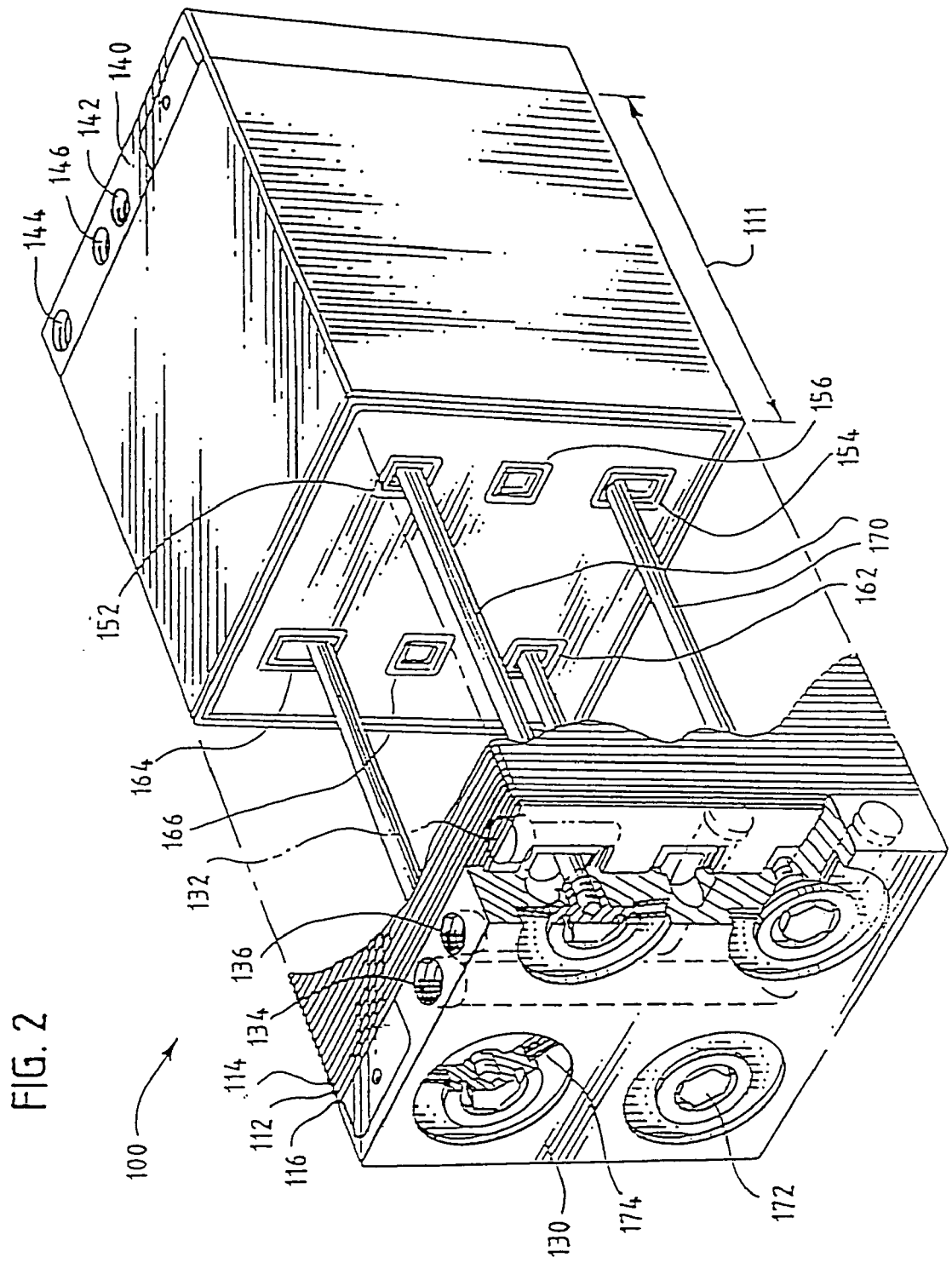
FIG. 2 is a perspective cut-away view of an electrochemical fuel cell stack.

Turning now to FIG. 2, a fuel cell stack 100 includes a plurality of fuel cell assemblies, a series of which is designated as 111 in FIG. 2. Each of the fuel cell assemblies includes a membrane electrode assembly 112 interposed between a pair of fluid flow field plates 114, 116. Fuel cell stack 100 also includes a first end plate 130 and a second end plate 140.

Plate 130 includes fluid inlet ports 132, 134, 136 for introducing fluid fuel, oxidant and coolant streams, respectively, to the stack. Plate 140 includes fluid outlet ports 142, 144, 146 for exhausting fluid fuel, oxidant and coolant streams, respectively, from the stack. The fluid outlet ports are fluidly connected to the corresponding fluid inlet ports via passages within the stack.

The fuel cell assemblies have a series of openings formed therein, which cooperate with corresponding openings in adjacent assemblies to form fluid manifolds 152, 154, 156, 162, 164, 166 within the stack 100. The fluid manifolds are each circumscribed by a sealant material or gasket. In addition, a peripheral seal at the exterior perimeter of each fuel cell fluidly isolates the interior, electrochemically active portion of the fuel cell from the external environment.

A fuel stream entering the stack via fuel inlet port 132 is directed to the individual fuel flow field plates via manifold 152. After passing through the fuel flow field plate channels, the fuel stream is collected in manifold 162 and exhausted from the stack via fuel outlet port 142. Similarly, an oxidant stream entering the stack via oxidant inlet port 134 is directed to individual oxidant flow field plates via manifold 154. After passing through the oxidant flow field plate channels, the oxidant stream is collected in manifold 164 and exhausted from the stack via oxidant outlet port 144. A fluid coolant (typically water) introduced via coolant inlet port 136 is directed to coolant plate assemblies (not shown) in the stack 100 via manifold 156. The coolant stream is collected in manifold 166 and exhausted from the stack via coolant outlet port 146. Coolant manifolds 156, 166 may be fitted with compliant means (not shown), such as tube cushions or inserts made of closed cell foam, to accommodate the expansion of freezing water. Tie rods 170 extend between end plates 130 and 140 to compress and secure stack 100 in its assembled state with fastening nuts 172 disposed at opposite ends of each tie rod, and disc springs 174 interposed between the fastening nuts 172 and end plates 130, 140.

Figure 3:
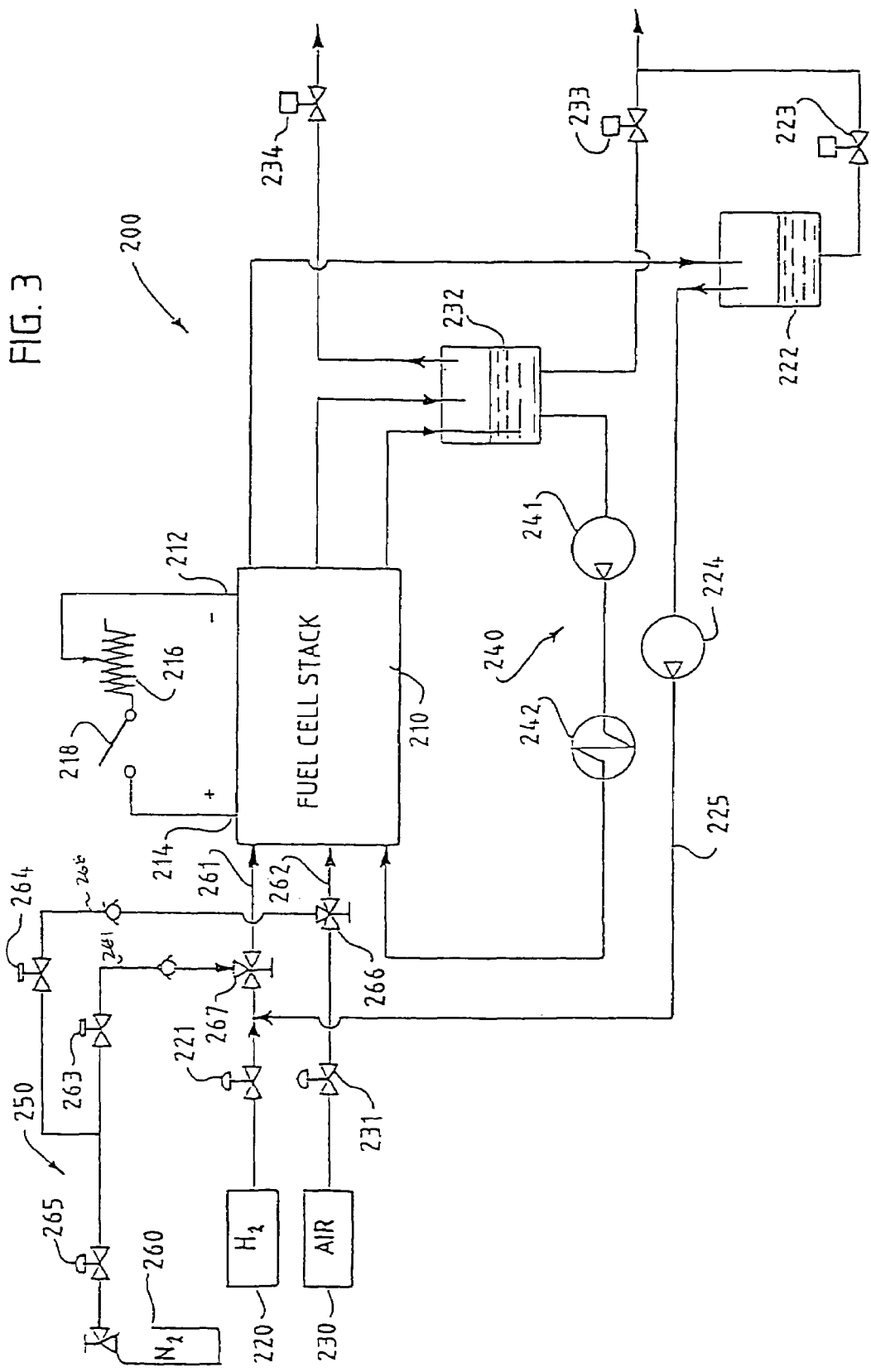
FIG. 3 is a schematic diagram of a fuel cell electric power generation system incorporating a nitrogen gas purge system.

FIG. 3 is a schematic diagram of a fuel cell electric power generation system 200 comprising a fuel cell stack 210 and a nitrogen gas purge system 250. The fuel cell stack 210 includes negative and positive bus plates 212, 214, respectively, to which an external circuit comprising a variable load 216 is electrically connectable to the stack 210 by closing switch 218. The system includes a fuel (hydrogen) circuit, an oxidant (air) circuit, and a coolant water circuit. The reactant and coolant streams are circulated in the system 200 in various conduits illustrated schematically in FIG. 3.

A hydrogen supply 220 is connected to the stack 210; hydrogen pressure is controllable by pressure regulator 221. Water in the hydrogen stream exiting the stack 210 is accumulated in a knock drum 222, which can be drained by opening valve 223. Unreacted hydrogen is recirculated to stack 210 by a pump 224 in recirculation loop 225. An air supply 230 is connected to the stack 210, the pressure of which is controllable by pressure regulator 231. Water in the air stream exiting the stack 210 is accumulated in reservoir 232, which can be drained by opening valve 233, and the air stream is vented from the system via valve 234.

In the coolant water loop 240, water is pumped from reservoir 232 and circulated through stack 210 by pump 241. The temperature of the water is adjusted in a heat exchanger 242.

Purge system 250 is used to purge the hydrogen and oxidant passages in fuel cell stack 210 with a low humidity, non-reactive gas such as nitrogen. Flow of purge gas from a purge gas supply 260 to the hydrogen and air inlet passages 261, 262 is transmitted through purge supply conduits 268, 269 and three way valves 266, 267 connected to respective hydrogen and air inlet passages 261, 262 upstream of the stack 210. The flow of nitrogen through each purge conduit 268, 269 is controlled by respective flow regulating valves 263, 264.

A micro-controller (not shown) or similar electronic control unit may be provided to automate at least some of the purge system operation. In a simple set-up, the micro-controller is programmed to control valves 221, 231, 263, 264, 265 266, 267, and switch 218. Upon receipt of instructions to shut down the system, the micro-controller opens switch 218 to interrupt the flow of electricity from the stack 210 to the circuit, then closes air and hydrogen supply valves 221, 231 and opens valves 263, 264, 266, 267 to enable purge fluid to be transmitted through conduits 268, 269 to air and hydrogen conduits 261, 262 and through the stack 210.

An additional purge conduit and three way valve (both not shown) may be connected to the coolant loop upstream of the stack 210 to enable purging of the coolant loop during the shut down procedure. The micro-controller is adapted accordingly to shut down pump 241 and heat exchanger 242 prior to directing purge fluid to the coolant loop.

Alternatively, the reactant streams themselves can be employed as the purge streams. Preferably the purge fluid, if it is a gas, is dry or at least not humidified. Thus, when employing the reactant streams as the purge streams, reactant stream humidifiers if present in the system are bypassed to provide streams having water carrying capacity greater than humidified reactant streams. A humidifier may be bypassed by reducing (or stopping) the amount of water transferred to a reactant stream passing through the humidifier, or by directing the reactant stream around the humidifier so that the reactant stream is fluidly isolated from the humidifier.

Figure 4:
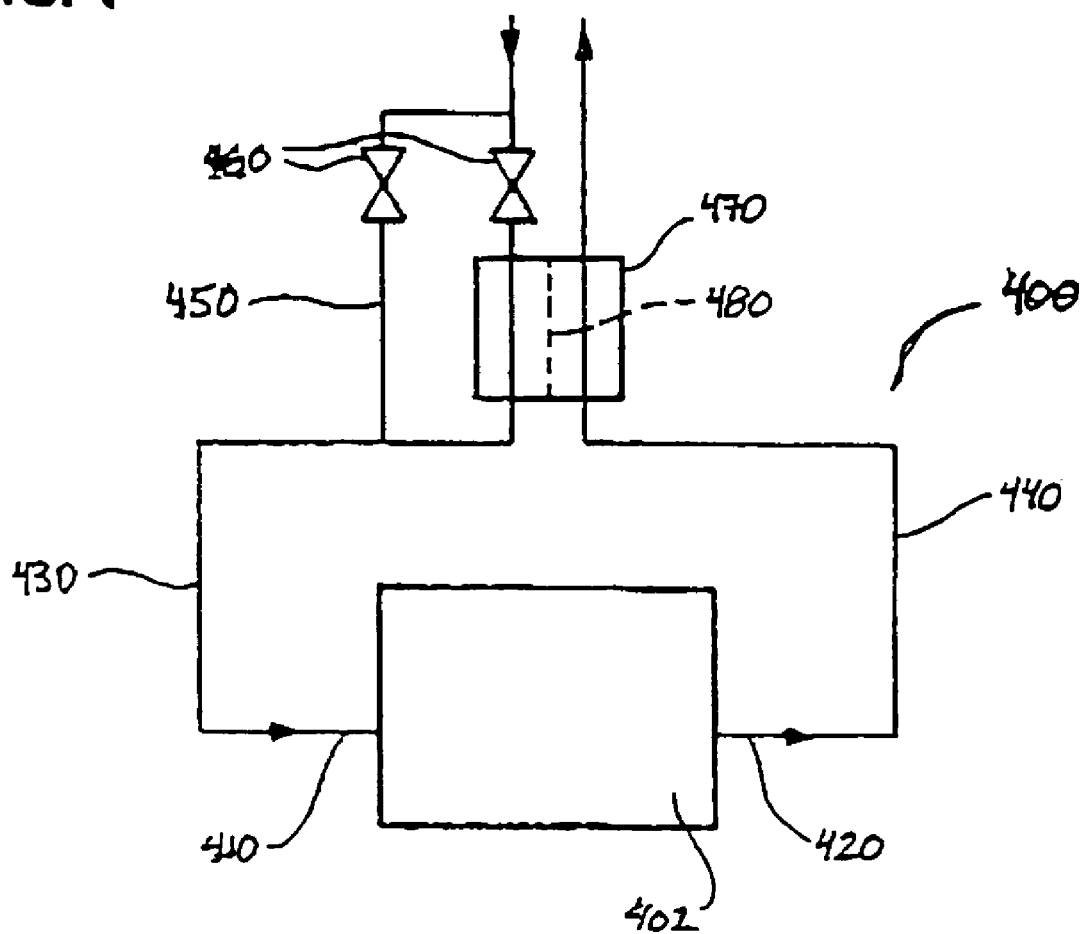
FIG. 4 is a schematic diagram of a humidifier bypass purge system employing a humidity exchanger.

A humidity exchanger of the type disclosed in U.S. Pat. No. 6,106,964 may be used to humidify a supply reactant stream during normal operation, and may be bypassed to provide a relatively dry reactant purge stream. Referring to FIG. 4, humidity exchanger system 400 replaces nitrogen gas purge system 250. A solid polymer fuel cell stack 402 has a reactant stream inlet port 410 and reactant stream outlet port 420. The flow path 430 of a reactant stream supplied to fuel cell stack 402 at inlet port 410 is shown schematically, as is the flow path 440 of an exhaust reactant stream exiting fuel cell stack 402 at outlet port 420. In an operating fuel cell system in which the fuel cell electrochemical reaction is exothermic and produces water, the exhaust reactant stream 440 will have a partial pressure of water vapor higher than the supply reactant stream 430. Supply reactant stream 430 and exhaust reactant stream 440 are directed through a humidity exchanger 470, on opposite sides of a water permeable membrane 480, preferably in a counterflow configuration as shown in FIG. 4, whereby water is transferred from exhaust reactant stream 440 to supply reactant stream 430. Preferably supply and exhaust reactant streams 430, 440 directed through humidity exchanger 470 are both oxidant streams. However, in principle, either (or both) exhaust stream could be used to humidify either (or both) reactant supply stream, provided membrane 210 is substantially impermeable to fuel and oxidant.

If stack 402 is disconnected from an external circuit (not shown) while reactant continues to be flowed, the electrochemical reaction stops, product water is no longer produced, and exhaust stream 440 will become progressively drier. As a result, the rate of water transfer to reactant supply stream 430 in humidity exchanger 470 will decrease and eventually stop. As a result, supply reactant stream 430 remains relatively dry and is suitable for purging stack 402.

Optionally, reactant supply bypass conduit 450 and control valves 460 (alternatively a single 3-way valve) are included so that reactant stream 430 can be supplied to fuel cell stack 402 without passing through the humidity exchanger 470. Of course, the bypass path could instead be configured so that the exhaust stream bypasses humidity exchanger 470.

Figure 5:
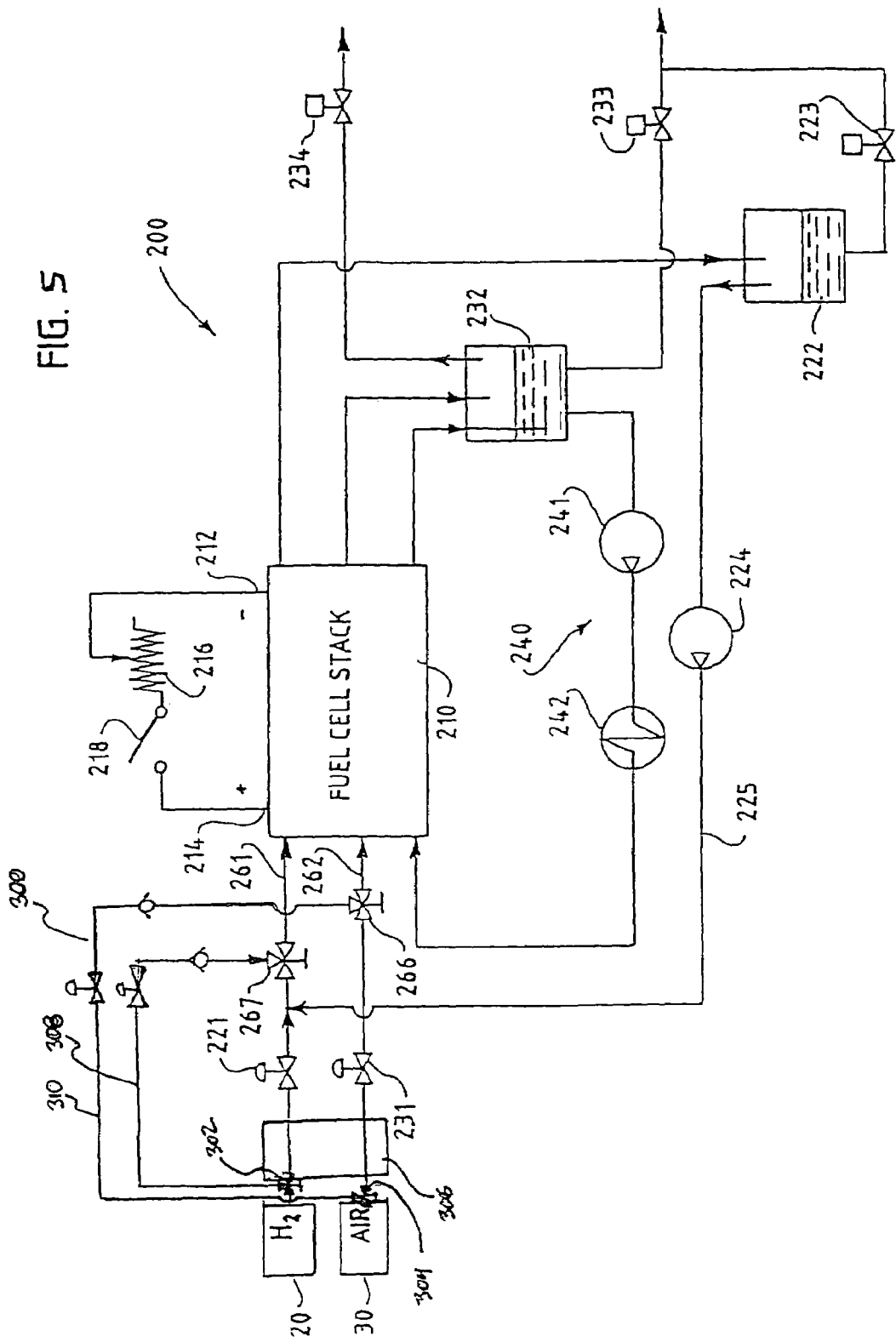
FIG. 5 is a schematic diagram of a fuel cell electric power generation system incorporating a humidifier bypass purge system.

Referring to FIG. 5, electric power generation system 200 may be modified by replacing nitrogen gas purge system 250 with another type of humidifier bypass system 300. Humidifier bypass system 300 comprises a series of valves and conduits that cooperate to direct the supply oxidant and fuel streams in fluid isolation from a humidifier. Particularly, upstream three-way bypass valves 302, 304 are provided on respective fuel and oxidant inlet passages 261, 262 between the oxidant and fuel supply sources 220, 230, and a humidifier 306. The humidifier 306 is preferably a contact-type gas humidifier; however other types of humidifiers known to a person skilled in the art can be used, e.g. a membrane humidifier, or the humidity exchanger described above (in the latter case, exhaust streams would be configured to pass though the humidity exchanger). A fuel bypass conduit 308 is connected to upstream fuel bypass valve 302 and to a downstream three-way valve 267 connected to fuel inlet passage 261 downstream of humidifier 306 and upstream of stack 210. Similarly, an oxidant bypass conduit 310 is connected to upstream oxidant bypass valve 304 and to a downstream three-way valve 266 connected to the oxidant inlet passage 262 downstream of the humidifier 306 and upstream of stack 210. The respective oxidant and fuel upstream and downstream bypass valves 302, 304, 267, 266 are operated to direct reactant flow through humidifier 306 and to stack 210 during normal stack operation, and through bypass conduits 308, 310 to stack 210 during a purging operation. As the bypass conduits 308, 310 are in fluid isolation from the humidifier 306, reactant supplied to the stack 210 via the bypass conduits 308, 310 avoid humidification. A control device (not shown) similar to that used to control the purge system 250 may be programmed to control the humidification bypass operation.

Humidifier 306 may also be an injection-type humidifier like the type disclosed in U.S. Pat. No. 5,432,020. In this humidifier, a quantity of finely atomized water is sprayed into the reactant stream passing through the humidifier. Humidification may be bypassed by stopping the water spraying, or by rerouting the supply reactant streams around the humidifier via bypass conduits 308, 310 and bypass valves 302, 304.

Figure 6:
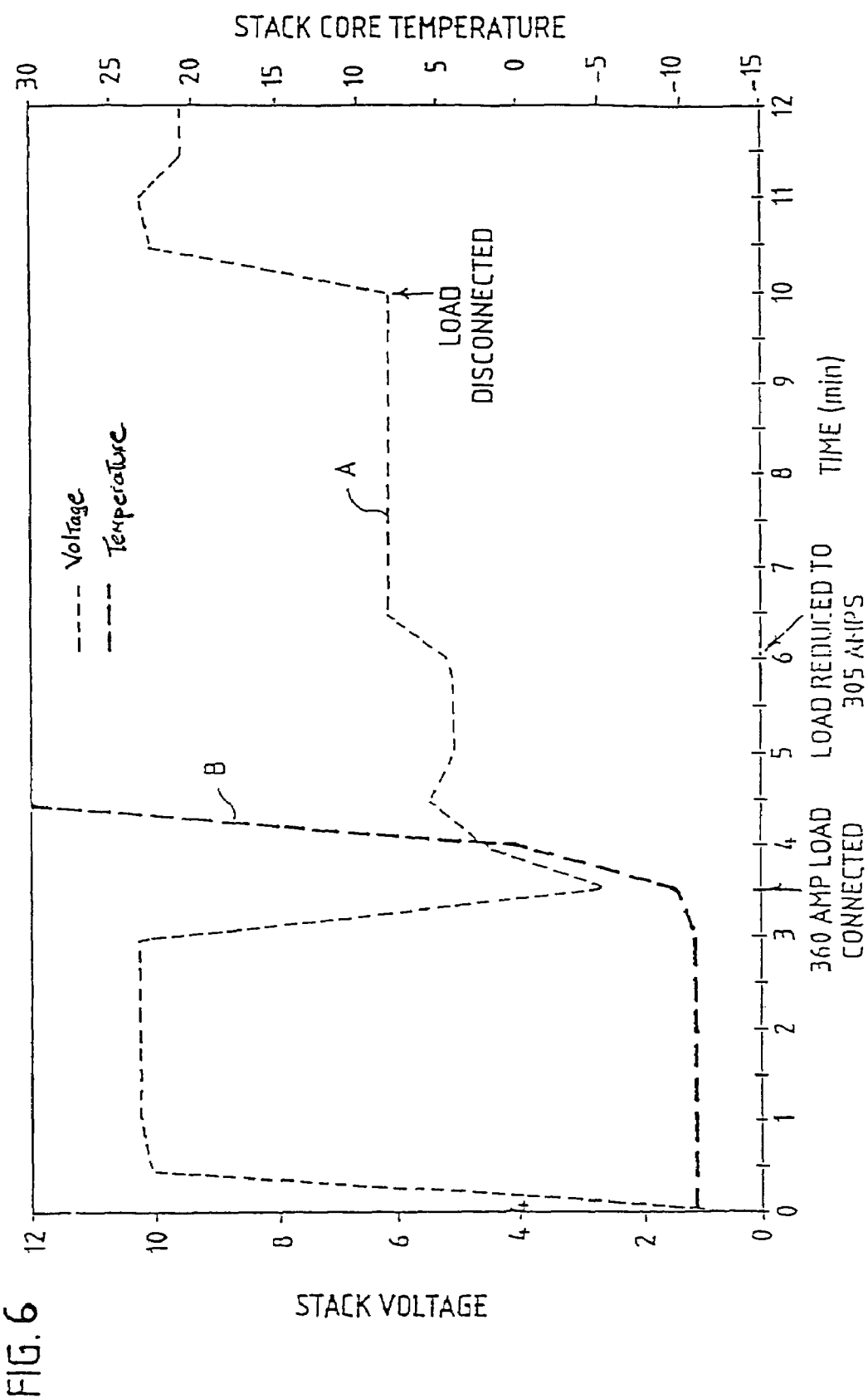
FIG. 6 is a composite plot of fuel cell stack voltage versus time in minutes (plot A) and fuel cell stack core temperature versus time in minutes (plot B) for a 10-cell stack, operation of which was commenced after the stack had equilibrated at a core temperature of −11° C.

FIG. 6 is a composite plot of fuel cell stack voltage versus time in minutes (plot A) and fuel cell stack core temperature versus time in minutes (plot B) for a 10-cell stack to which the flow of fuel and oxidant was restored after the stack had equilibrated at a core temperature of $-11°$ C.

The stack had been operating previously, and therefore the reactant flow passages contained moist gases. Before decreasing the stack core temperature below the freezing temperature of water, the reactant and coolant water passages within the stack were purged by circulating dry, compressed air through them. The stack core temperature was then lowered below the freezing temperature of water by exposing the stack to a surrounding environment with a temperature below the freezing temperature of water. For the purposes of the examples described herein, the stack was typically placed in an insulated chamber, with the fluid and electrical connections to the stack fitted through the chamber walls. Cold nitrogen gas from a liquid nitrogen source was circulated through the chamber. The stack core temperature was measured using a thermocouple positioned in a thermally conductive plate located between two fuel cells in the center of the stack. Stack voltage, stack current and ambient temperature were also monitored.

When circulation of hydrogen and air through the stack was commenced at a stack core temperature of $-11°$ C. (at time=0 minutes), the open circuit voltage was normal. A load (360 amp) was connected in the circuit after approximately three minutes, causing the stack core temperature to rise rapidly while the voltage decreased but recovered gradually. Once operation of the stack had commenced, the exothermic reaction of hydrogen and oxygen within the stack and the resistive heating due to internal ohmic losses caused the stack core temperature to rise.

Figure 7:
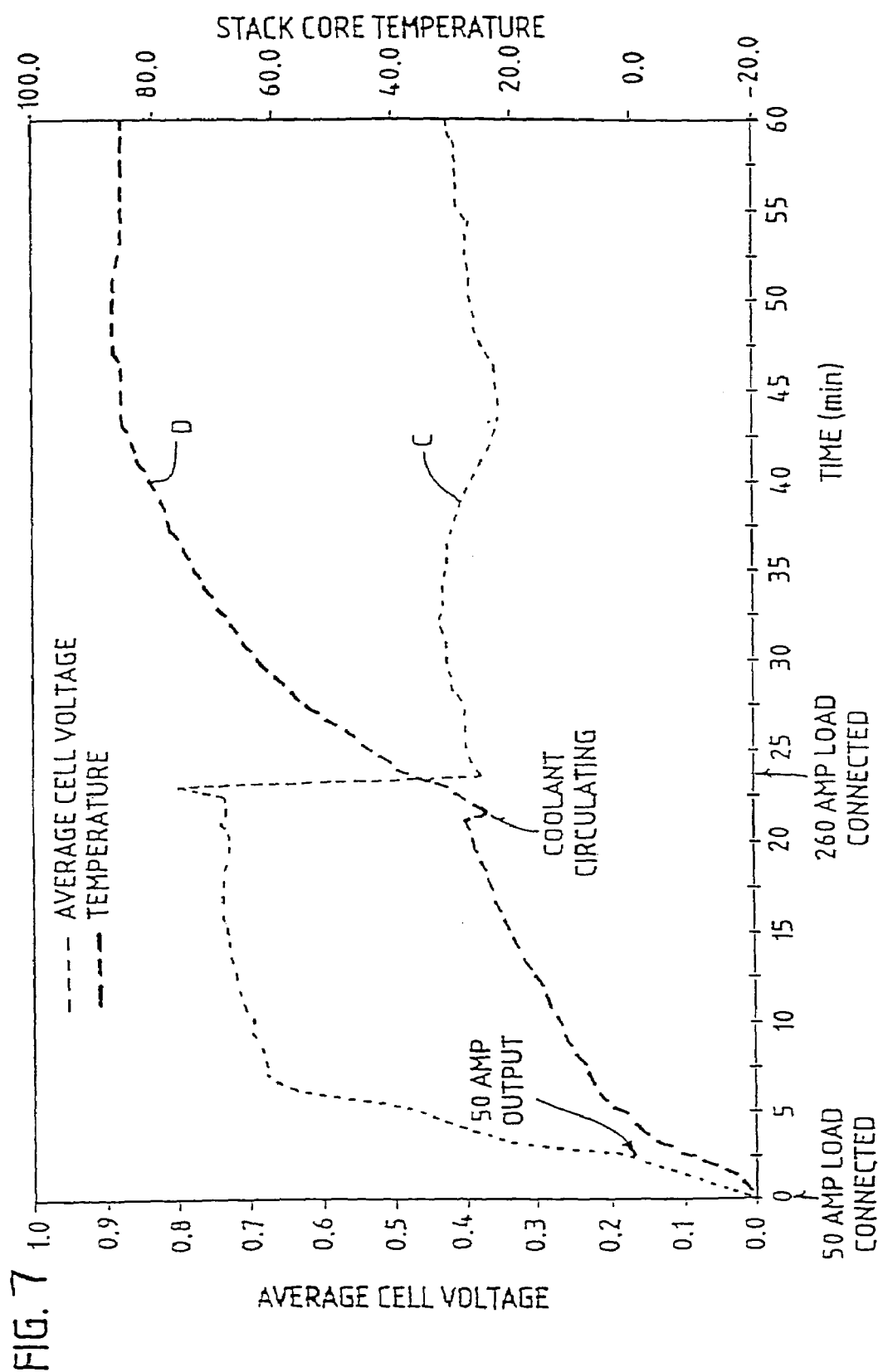
FIG. 7 is a composite plot of fuel cell stack voltage versus time in minutes (plot C) and fuel cell stack core temperature versus time in minutes (plot D) for a 4 cell stack, operation of which was commenced at a core temperature of −19° C.

FIG. 7 is a composite plot of fuel cell stack voltage versus time in minutes (plot C) and fuel cell stack core temperature versus time in minutes (plot D) for a 4-cell stack, operation of which was commenced at a core temperature of $-19°$ C. Again, as the stack had been operating previously, before decreasing the stack core temperature to $-19°$ C., the reactant passages within the stack were purged by circulating dry nitrogen. Coolant water remained in the coolant passages. Preferably the purge fluid is an inert gas such as nitrogen. Circulation of hydrogen and air was commenced with a load (50 amp) connected. Approximately 2 minutes transpired before the output current reached 50 amps. The load was increased to 260 amps once the stack reached about $30°$ C., and the coolant pump was then activated. One cell in the stack was not operating properly; hence the lower than normal average cell voltages.

During commencement of stack operation, it has been found advantageous to refrain from circulating the fluid coolant stream within the stack until the stack has reached a temperature above the freezing temperature of water. More preferably, the fluid coolant stream is not circulated until the stack has reached a temperature at or near the desired stack operating temperature. In this regard, the circulating fluid coolant stream, assuming it is not pre-heated, will absorb and carry away heat otherwise available to warm the stack.

Refraining from circulating the fluid coolant stream therefore expedites the warming of the stack to its desired operating temperature.

The cold start capability and freeze tolerance of fuel cells can be improved by reducing the amount of water remaining within the passages of the stack upon cessation of operation and reduction of stack core temperature to near or below the freezing temperature of water. As used herein, "freeze tolerance" refers to the ability of a fuel cell or fuel cell stack to maintain substantially the same performance after one or more freeze/thaw cycles.

The reactant passages, including the manifolds and individual fuel cell reactant flow passages within a fuel cell stack, are preferably purged with a fluid stream before the temperature of the stack is decreased to below the freezing temperature of water. Preferably a fluid which is not reactive in the fuel cell environment, such as nitrogen gas, is used. A liquid may be used as the purge fluid. Preferably it would be a liquid that does not freeze at the temperature to which the fuel cell is to be exposed, and which has no detrimental effect on the fuel cell components.

The greater water carrying capacity of unhumidified reactant purge streams will result in more effective absorption and removal of water from the reactant stream conduits and porous components of the stack. Although all the reactant and coolant passages may be desirably purged in some situations, it has also been found effective in many cases to purge the oxidant stream passages only. This can simplify the system and the shutdown sequence.

It has been found that improved cold start capability and freeze tolerance of fuel cells to multiple freeze/thaw cycles can also be achieved when one or more of the fuel, oxidant, coolant and humidification passages are purged after the stack core temperature has been reduced to at or below normal room temperature (hereinafter referred to as "cold purging"). The beneficial effect of purging is not quite so pronounced when the stack passages are purged at a temperature within the normal stack operating temperature range (hereinafter referred to as "hot purging").

EXAMPLES

Purge Methods

Experimental Details

The effect of cold and hot purging on membrane electrode assemblies having two different membrane types, Nafion® 1135 and a DowPont™ membrane, in a Ballard Mark 513 single fuel cell with an internal humidifier was investigated. Separate water feed lines for the coolant and humidification streams were employed. The coolant outlet temperature was 85° C. with a ΔT (change in temperature from inlet to outlet) of 10° C. at 1000 ASF (10764 ASM), using air as the oxidant. Both MEAs had a screen printed anode containing 3.87 mg/cm$^2$ platinum black electrocatalyst on carbon fiber paper. For the cathode, both MEAs had 3.87 mg/cm$^2$ platinum black electrocatalyst applied by hand to carbon fiber paper. The Nafion® 1135 membrane employed in MEA No. 513-15 had an equivalent weight of 1100 and a thickness of about 85 μm (dry). The DowPont™ membrane employed in MEA No. 513-22 had an equivalent weight of 800 and a thickness of about 100 μm (wet).

The Mark 513 cell was assembled and run overnight at 600 ASF (6458 ASM) at an air/fuel pressure of 30/30 psig (207/207 kPa gauge) and a stoichiometry of 2/1.5 respectively. The fuel was substantially pure hydrogen. "Stoichiometry" is the ratio of the amount of reactant supplied to the fuel cell stack to the amount of reactant actually consumed in the fuel cell stack. In this instance, a fuel stoichiometry of 1.5 means that 150 parts of hydrogen are supplied to the fuel cell for each 100 parts actually consumed in the fuel cell.

Cold Purge Freeze/Thaw Cycles

For the initial series of three freeze/thaw cycles (results shown in FIGS. 8 and 9), the cell was cooled from its normal operating temperature (approximately 85° C.) to room temperature (approximately 23° C.) before purging. In each case, the fuel, oxidant, coolant and humidification passages were purged for approximately 7 minutes with nitrogen. The cell containing the Nafion® 1135 membrane was taken through a fourth freeze/thaw cycle with a purge duration of only approximately 1 minute (results shown in FIG. 9). The cell inlets and outlets were capped and the cell was placed in a freezer. Internal sealing pressure within the cell was maintained during freezing. The freezer temperature was approximately −20° C. The duration of the freeze ranged from 15-20 hours. After removal from the freezer, the coolant lines were connected and the cell was heated to 50° C. At that point, operation of the fuel cell was commenced at 50 ASF (538.2 ASM) with excess fuel and oxidant flow rates. When the cell temperature reached 60° C., the current density was increased to 600 ASF (6458 ASM) and the cell was operated for at least one hour or until cell voltage had stabilized. A polarization test from 0 to 1000 ASF (0 to 10764 ASM) was performed for each of the two MEAs tested, using two different oxidant streams: air and substantially pure oxygen.

Figure 8:
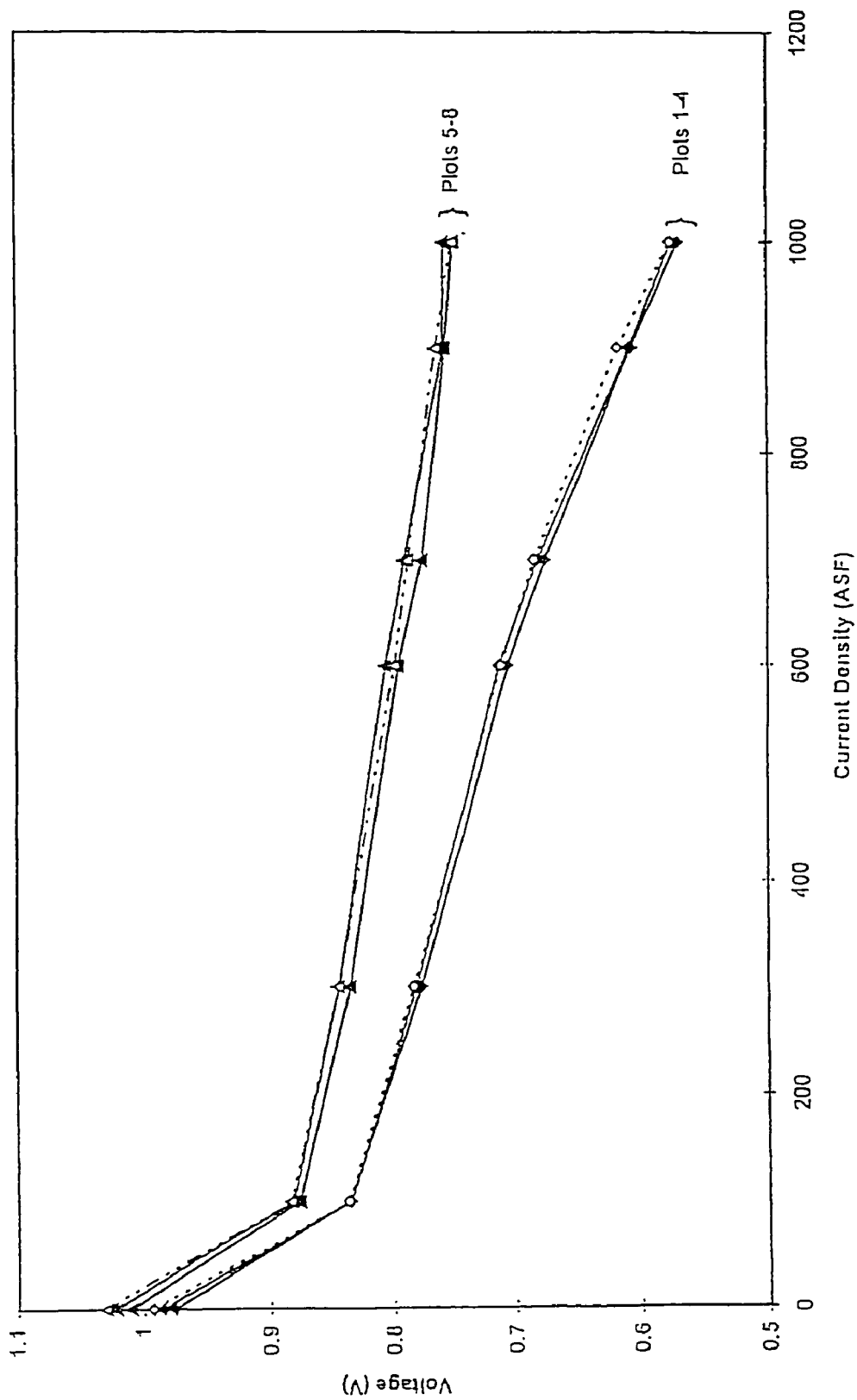
FIG. 8 is a plot of voltage as a function of current density for a fuel cell containing a membrane electrode assembly with a DowPont™ membrane exposed to three cold purge freeze/thaw cycles.

FIG. 8 is a plot of voltage as a function of current density for the fuel cell containing MEA 513-22 (DowPont™ membrane). Plots 1-4 show the performance on air prior to freezing (which is the plot with the solid line and solid data points ♦), and after each of the three cold purge freeze/thaw cycles described above. Plots 5-8 show the performance on oxygen prior to freezing (which is the plot with the solid line and solid data points σ), and after each of the three cold purge freeze/thaw cycles described above. For each of the oxidant streams, the four plots in FIG. 8 are difficult to distinguish from one another.

Figure 9:
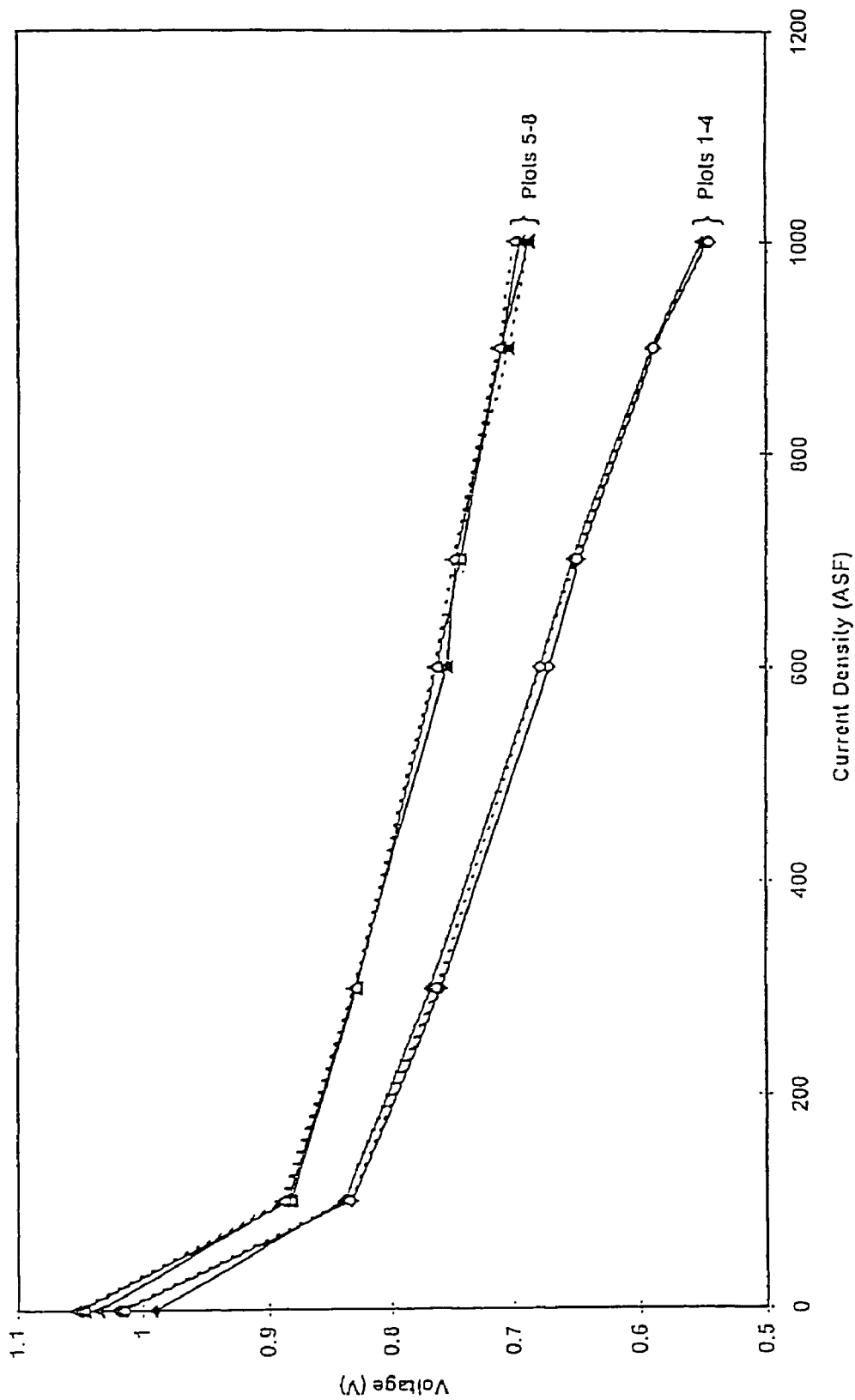
FIG. 9 is a plot of voltage as a function of current density for the fuel cell containing a membrane electrode assembly with a Nafion®1135 membrane exposed to three cold purge freeze/thaw cycles.

FIG. 9 is a plot of voltage as a function of current density for the fuel cell containing MEA 513-12 (Nafion® 1135 membrane). Plots 1-4 show the performance on air prior to freezing (which is the plot with the solid line and solid data points ♦), and after each of the three cold purge freeze/thaw cycles described above. Plots 5-8 show the performance on oxygen prior to freezing (which is the plot with the solid line and solid data points σ), and after each of the three cold purge freeze/thaw cycles described above. Again, for each of the oxidant streams, the four plots in FIG. 9 are difficult to distinguish from one another.

Figure 10:
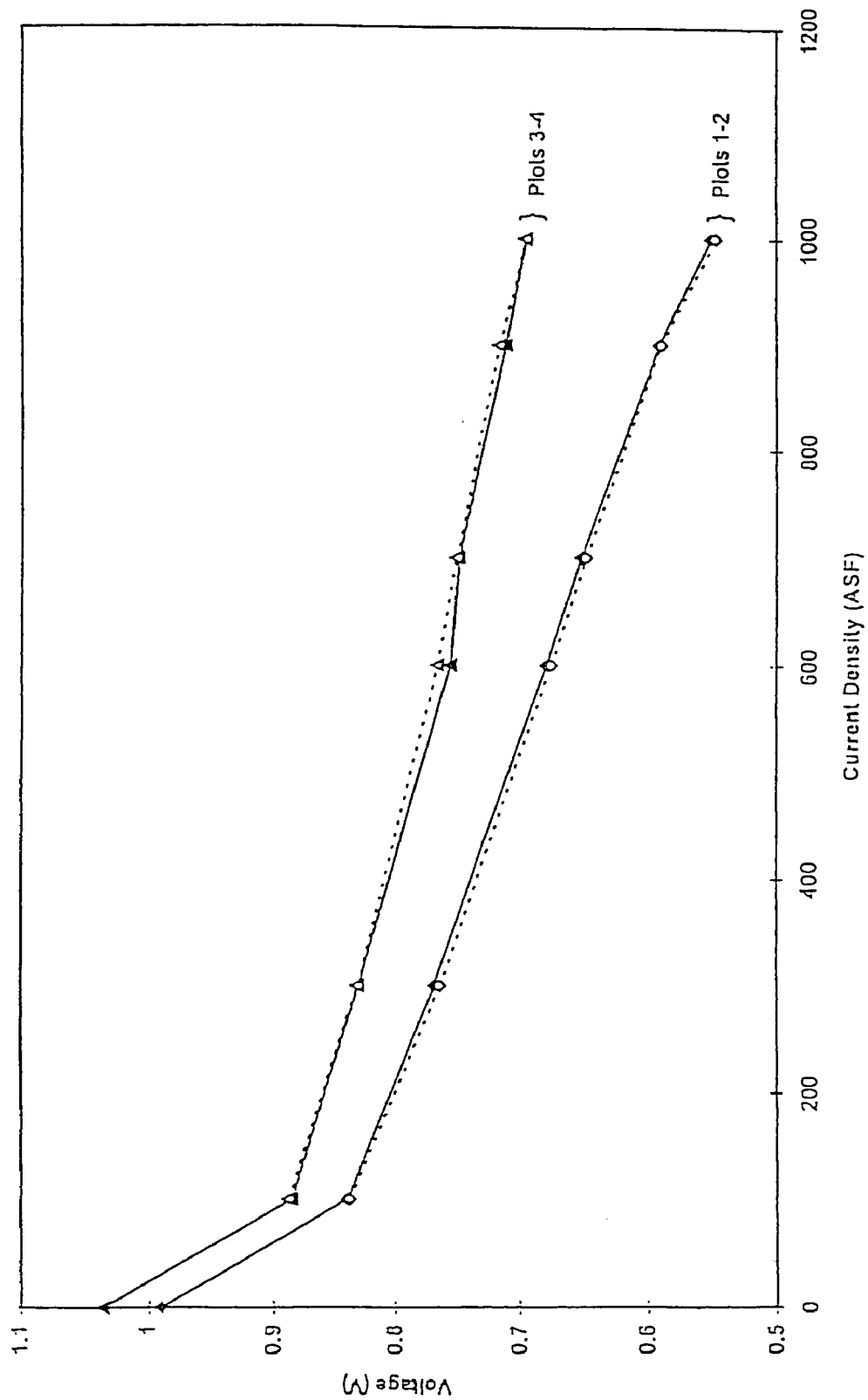
FIG. 10 is a plot of voltage as a function of current density for a fuel cell containing a membrane electrode assembly with a Nafion® 1135 membrane exposed to one shorter duration cold purge freeze/thaw cycle.

FIG. 10 is a plot of voltage as a function of current density for the fuel cell containing MEA 513-12 (Nafion® 1135 membrane). Plots 1-2 show the performance on air prior to freezing (which is the plot with the solid line and solid data points ♦), and after the fourth cold purge freeze/thaw cycle described above, in which a shorter purge duration (approximately 1 minute) was used. Plots 3-4 show the performance on oxygen prior to freezing (which is the plot with the solid line and solid data points σ), and after the fourth cold purge freeze/thaw cycle described above. Again, for each of the oxidant streams, the two plots in FIG. 10 are difficult to distinguish from one another, indicating that a shorter duration purge can give satisfactory results.

Thus, based on the results shown in FIGS. 8, 9 and 10 for both MEAs, substantially no mass transport losses were exhibited over the series of three or four freeze/thaw cycles.

The performance after each freeze/thaw cycle was maintained at approximately baseline (prior to freezing) polarization levels. Both MEAs thus exhibited favorable freeze/thaw tolerance when the cold purging technique was used.

Hot Purge Freeze/Thaw Cycles

For a subsequent series of three freeze/thaw cycles, each cell was purged at stack operating temperature (approximately 85° C.) before cooling. The fuel, oxidant, coolant and humidification passages were purged for approximately 1 minute with nitrogen. The cell inlets and outlets were capped and the cell was placed in a freezer. Internal sealing pressure within the cell was maintained during freezing. The freezer temperature was approximately −20° C. The duration of the freeze ranged from 15-20 hours. After removal from the freezer, the coolant lines were connected and the cell was heated to operating temperature and operation commenced using essentially the same procedure employed for the cold purge freeze/thaw cycles described above. A polarization test from 0 to 1000 ASF (0 to 10764 ASM) was performed for each of the two MEAs tested, again using two different oxidant streams: air and substantially pure oxygen.

Figure 11:
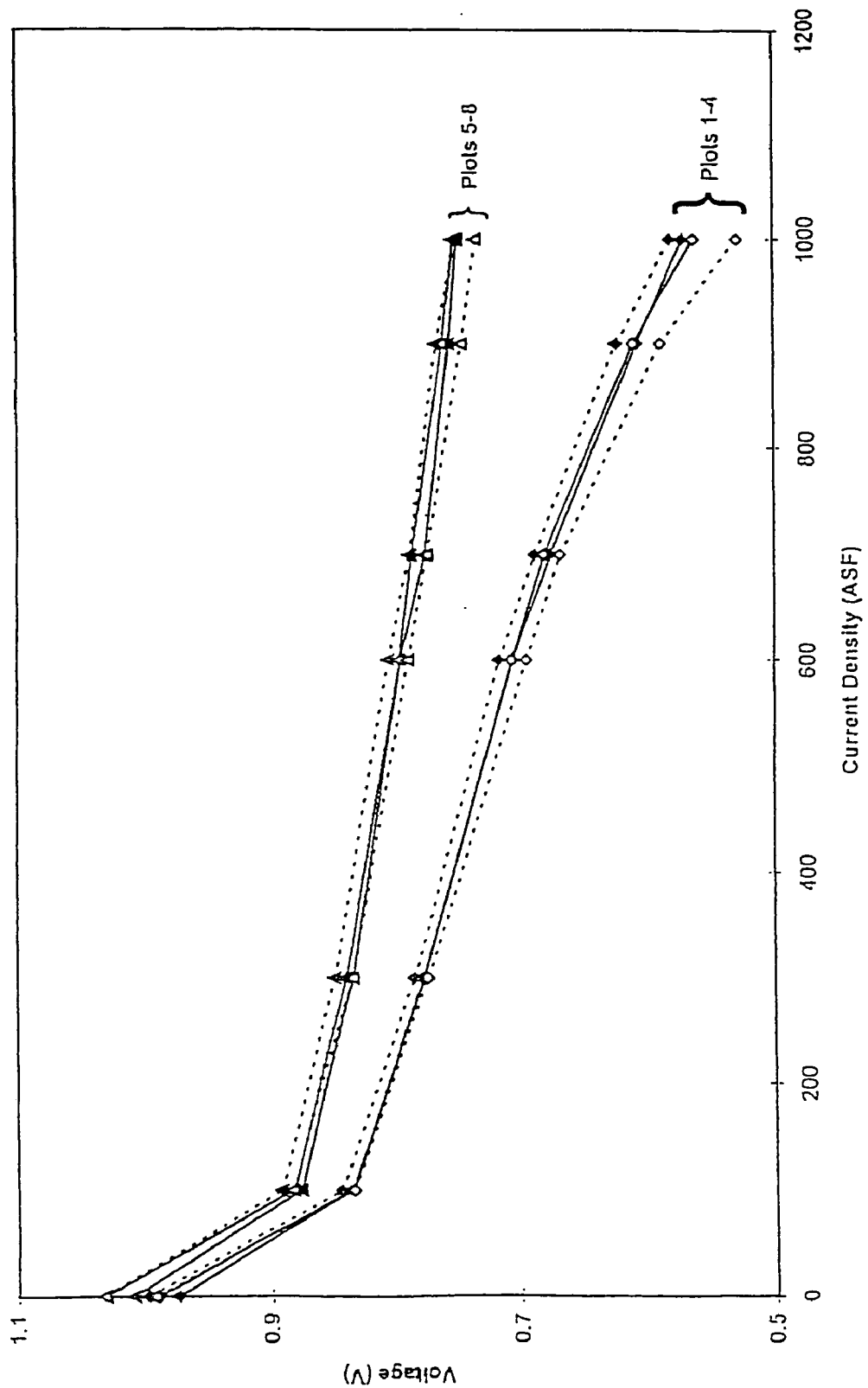
FIG. 11 is a plot of voltage as a function of current density for a fuel cell containing a membrane electrode assembly with a DowPont™ membrane exposed to three hot purge freeze/thaw cycles.

FIG. 11 is a plot of voltage as a function of current density for the fuel cell containing MEA 513-22 (DowPont™ membrane). Plots 1-4 show the performance on air prior to freezing (which is the plot with the solid line and solid data points ♦), and after each of the three hot purge freeze/thaw cycles described above. Plots 5-8 show the performance on oxygen prior to freezing (which is the plot with the solid line and solid data points σ), and after each of the three hot purge freeze/thaw cycles described above. A significant mass transport effect appears to occur at higher current densities on air after the third freeze cycle, based on the increased difference between the air and oxygen performance levels.

Figure 12:
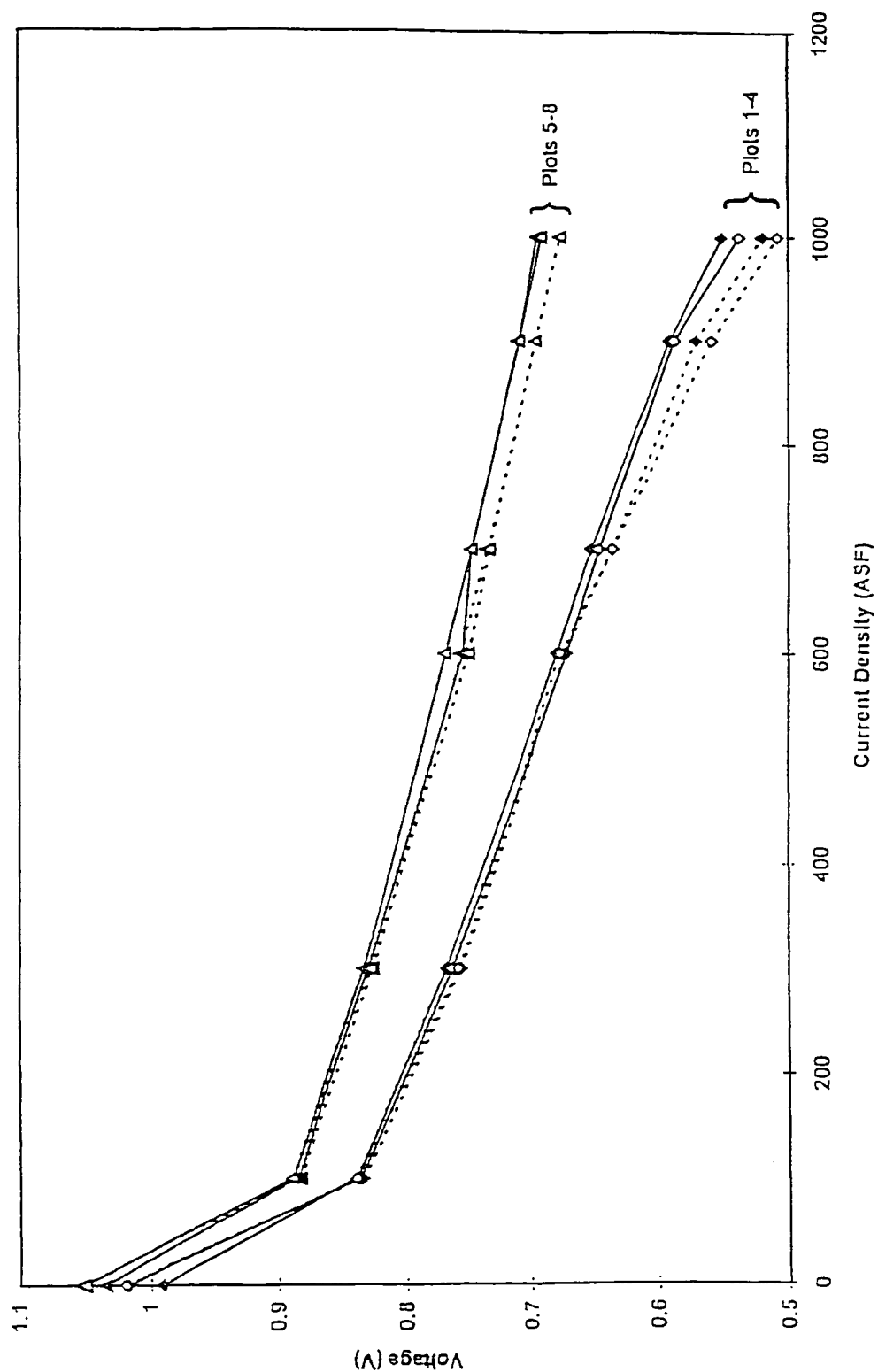
FIG. 12 is a plot of voltage as a function of current density for the fuel cell containing a membrane electrode assembly with a Nafion® 1135 membrane exposed to three hot purge freeze/thaw cycles.

FIG. 12 is a plot of voltage as a function of current density for the fuel cell containing MEA 513-12 (Nafion® 1135 membrane. Plots 1-4 show the performance on air prior to freezing (which is the plot with the solid line and solid data points ♦), and after each of the three hot purge freeze/thaw cycles described above. Plots 5-8 show the performance on oxygen prior to freezing (which is the plot with the solid line and solid data points σ), and after each of the three hot purge freeze/thaw cycles described above. Again, a significant mass transport effect appears to occur at higher current densities on air, based on the progressively increasing difference between the air and oxygen performance levels after each freeze/thaw cycle.

The particularly favorable results obtained with the cold purge technique were further supported by the following test in which a single fuel cell was cycled through 55 freeze/thaw cycles, with the purge technique used on the coolant and cathode side passages only.

Experimental Details

The effect of repeated cold purging on a membrane electrode assembly having a Nafion® 112 membrane, in a Ballard Mark 513 single fuel cell with an external humidifier was investigated. Separate water feed lines for the coolant and humidification streams were employed. The coolant inlet temperature was 70° C. with a ΔT (change in temperature from inlet to outlet) of 15° C. at 1 A/cm² using air as the oxidant. The MEA had a screen printed anode containing 0.34-0.38 mg/cm² platinum black electrocatalyst and a screen printed cathode containing 0.73-0.82 mg/cm² platinum black electrocatalyst on carbon fiber paper, both with a Nafion spray coating (0.2 mg/cm²).

The cell was tested in a temperature-controlled environmental chamber at an air/fuel pressure of 27/27 psig (186/186 kPa gauge) and a stoichiometry of 1.8/1.2 respectively. The fuel was a simulated methanol reformate stream (composition 63.5% hydrogen; 22.5% carbon dioxide; 13% nitrogen; 1% methanol and 40 ppm carbon monoxide), and a 4% air bleed was used at the anode. The fuel and oxidant streams were humidified.

For the series of 55 freeze/thaw cycles (results shown in FIG. 13), the cell was cooled from its normal operating temperature (approximately 80° C.) to a chamber temperature at which no part of the stack was below 0° C., but where the cell temperature was approximately 30° C. before purging. In each case, the oxidant passages were purged for approximately 10 seconds with dry (unhumidified) air. The cell inlets and outlets were closed by actuated valves, and the temperature in the chamber was reduced to approximately −25° C. The duration of each freeze was approximately 1 hour. Internal sealing pressure within the cell was maintained during freezing. The cell was then thawed to 5° C. and then heated, by circulating warm coolant, to 65° C. At that point, operation of the fuel cell was commenced at 0.5 A/cm² for 60 minutes, then at 1.0 A/cm² for 30 minutes, then for a second time at 0.5 A/cm² for 30 minutes.

Figure 13:
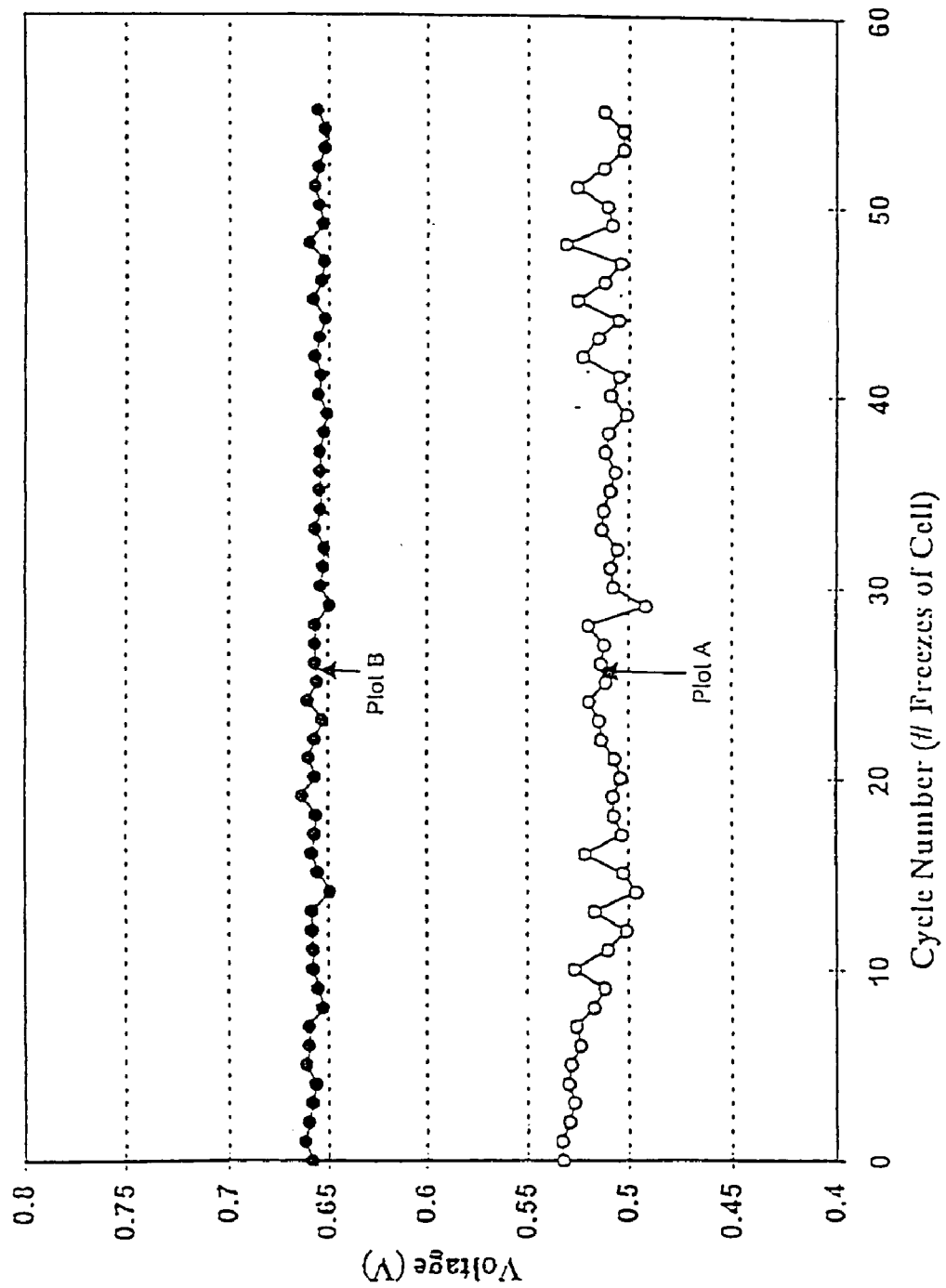
FIG. 13 is a plot of cell voltage, for the fuel cell containing a membrane electrode assembly with a Nafion® 112 membrane, after each of a series of 55 cold purge freeze/thaw cycles.

FIG. 13 shows the results obtained after each of 55 such cycles with the cell voltage measured once it had stabilized at 1.0 A/cm² during the 30 minutes of operation at that current density (Plot A) and once it had stabilized at 0.5 A/cm² during the second period of operation at that current density (Plot B). At both current densities the performance degradation over the 55 cycles was negligible: approximately −0.1 mV/cycle at 0.5 A/cm² and approximately −0.2 mV/cycle at 1.0 A/cm².

EXAMPLES

Heat Treatment Methods

Figure 14:
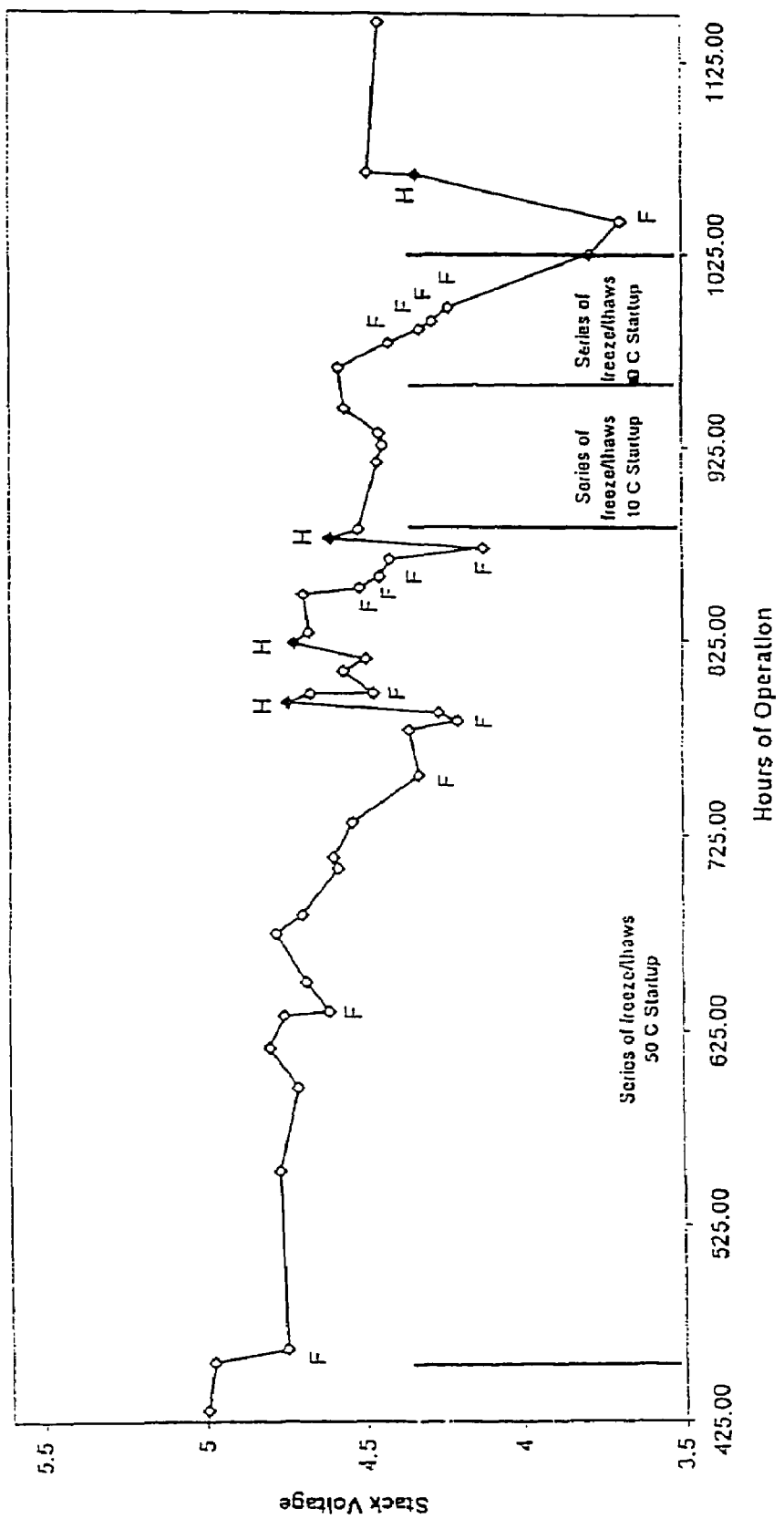
FIG. 14 is a plot of stack voltage against operating time for an 8-cell Ballard Mark 513 fuel cell stack which was subjected to a series of freeze-thaw-operation cycles, interspersed with four heat treatment cycles.

FIG. 14 shows a plot of stack voltage against operating time for an 8-cell Ballard Mark 513 fuel cell stack which was subjected to a series of freeze-thaw-operation cycles. Prior to freezing the fuel, oxidant and coolant passages were purged with dry gas. During the freezing cycles, the cell inlets and outlets were capped and the cell was placed in a freezer. Internal sealing pressure within the cell was maintained during freezing. The freezer temperature was approximately −20° C. The duration of the freeze in each case was greater than 12 hours. After some cycles the stack was operated normally, and after other cycles the stack operating temperature was increased to above its normal operating temperature for a period, before normal operation was resumed. The stack was operated on humidified air and hydrogen, both at 30 psig (207 kPa gauge), at stoichiometries of 2.0 and 1.5 respectively, at a current density of 700 ASF (7535 ASM) to generate the data shown in FIG. 14. The coolant inlet temperature was 75° C. with a ΔT (change in temperature from inlet to outlet) of 10° C. at 1000 ASF (10764 ASM).

Referring to FIG. 14, between 425 and 882 hours the stack was operated, frozen several times, and then started up having been warmed to 50° C. Data points obtained directly after a freeze cycle are marked F. It can be seen that the cell performance deteriorated after each freeze cycle. After 882 hours the stack was started up after freeze cycles having been warmed to only 10° C. After 950 hours the stack was started up after freeze cycles having been warmed to only 0° C. The performance losses observed did not appear to be significantly affected by the start temperature.

A substantial improvement in performance after freezing was obtained in 4 cases where stack operation was commenced and then the stack operating temperature was increased to above the normal stack operating temperature of about 85° C., namely, to approximately 100° C. Data points obtained directly after such heat treatments are marked H.

Figure 15:
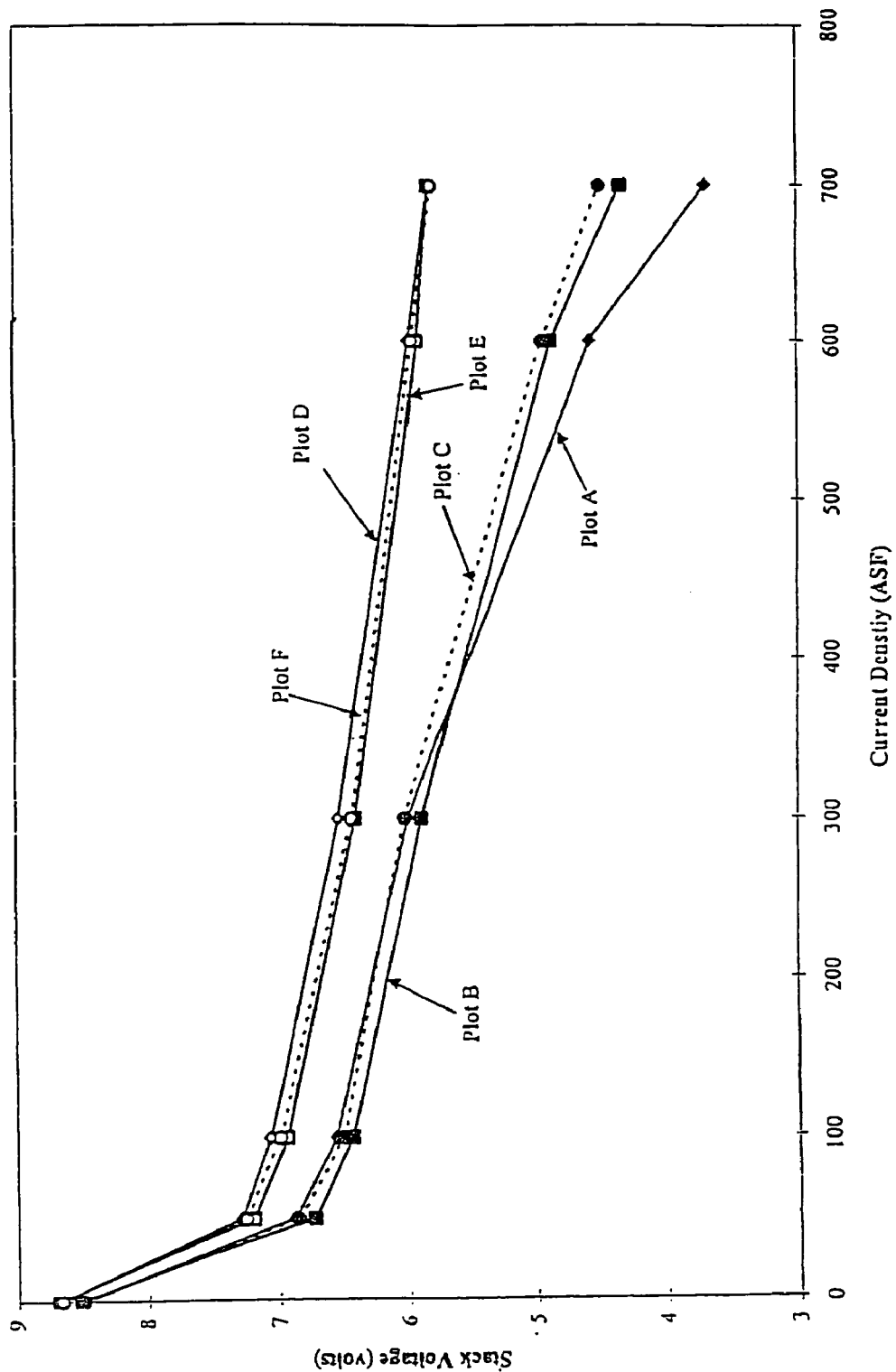
FIG. 15 is a plot of stack voltage against current density for the fuel cell stack used to generate the data of FIG. 14, before and after heat treatment.

FIG. 15 shows a plot of stack voltage as a function of current density for the 8-cell Ballard Mark 513 fuel cell stack used to generate the data of FIG. 14. Plots A, B and C show performance curves for operation on air, and plots D, E and F for operation on oxygen. Plots A and D show the stack performance before any of the heat treatments referred to the description of FIG. 14 but after the final freeze cycle, plots B and E show the stack performance immediately after the fourth heat treatment, and plots C and F show the stack performance about 2 days after the fourth heat treatment. The results on air show a substantial and sustained improvement in post-freezing performance after the heat treatment. The improvement is believed to be attributable to improved mass transport in the MEA, based on the fact that on oxygen the performance was not significantly affected by the heat treatment. This indicates that performance loss after freezing may be, at least in part, due to mass transport issues in the cells, which have a more significant effect on air than on a substantially pure oxidant stream. These effects could be due to retained water in the membrane electrode assembly. It is possible that the heat treatment method assists in removing residual water from the membrane electrode assembly, and thereby improves performance at start-up, particularly on air.

The patent(s), patent application(s) and publication(s) referred to in this specification, including U.S. patent application Ser. No. 08/659,921 filed Jun. 7, 1996, now U.S. Pat. No. 5,798,186 issued Aug. 25, 1998, entitled "Method and Apparatus for Commencing Operation of a Fuel Cell Electric Power Generation System Below the Freezing Temperature of Water"; U.S. patent application Ser. No. 09/138,625 filed Aug. 24, 1998, entitled "Method and Apparatus for Commencing Operation of a Fuel Cell Electric Power Generation System Below the Freezing Temperature of Water"; U.S. patent application Ser. No. 09/406,318 filed Sep. 27, 1999, now U.S. Pat. No. 6,479,177 issued Nov. 12, 2002, entitled "Methods for Improving the Cold Starting Capability of an Electrochemical Fuel Cell"; U.S. patent application Ser. No. 09/819,875, filed on Mar. 28, 2001, entitled "Apparatus for Improving the Cold Starting Capability of an Electrochemical Fuel Cell"; U.S. Pat. No. 6,106,964 issued Aug. 22, 2000 (application Ser. No. 09/108,156 filed Jun. 30, 1998), entitled "Solid Polymer Fuel Cell System and Method for Humidifying and Adjusting the Temperature of a Reactant Stream"; and U.S. Pat. No. 5,432,020 issued Jul. 11, 1995 (application Ser. No. 08/257,328 filed Jun. 7, 1994), entitled "Process and Apparatus for Humidifying Process Gas for Operating Fuel Cell Systems" are each incorporated herein by reference in their entirety. In addition, related U.S. patent application Ser. No. 09/819,506, filed on Mar. 28, 2001 (the same date on which the '875 application was filed), entitled "Methods and Apparatus for Improving The Cold Starting Capability of a Fuel Cell", and U.S. patent application Ser. No. 10/109,982, filed on Mar. 28, 2002, entitled "Methods and Apparatus for Improving the Cold Starting Capability of a Fuel Cell" are each incorporated herein by reference in their entirety.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. An electric power generation system comprising:
   (a) a fuel cell stack connectable to an external electrical circuit for supplying electric current to said external circuit, said stack comprising at least one solid polymer fuel cell, and reactant stream passages for directing reactant streams through said at least one fuel cell;
   (b) a humidifier in fluid communication with at least one of said reactant stream passages, for humidifying a reactant stream supplied to said stack; and
   (c) a purge system comprising a humidifier bypass assembly comprising (1) at least one bypass conduit for directing said reactant stream to said stack in fluid isolation from said humidifier and (2) a bypass control device for selectively directing flow of said reactant stream to said stack through either of said humidifier and said humidifier bypass conduit; and
   (d) a purge flow control device for actuating said bypass control device, after the supply of electric current from said stack to said external circuit has been interrupted, to direct flow of said reactant stream to said stack while bypassing said humidifier, such that water is purged from at least one of said reactant stream passages of said stack, whereby the amount of water remaining within said at least one reactant stream passage is reduced,
   wherein said bypass control device comprises a bypass inlet valve connected to one of said reactant stream passages upstream of said humidifier, and a bypass outlet valve connected to one of said reactant stream passages downstream of said humidifier, and wherein said bypass conduit is connected to said bypass inlet and outlet valves.

2. The electric power generation system of claim 1 wherein said at least one bypass conduit comprises an inlet end connected to one of said reactant stream passages upstream of said humidifier, and an outlet end connected to one of said reactant stream passages downstream of said humidifier.

3. The electric power generation system of claim 1 wherein said at least one bypass conduit comprises an inlet end connectable to a reactant supply, and an outlet end connected to one of said reactant stream passages downstream of said humidifier.

4. The electric power generation system of claim 1 wherein said bypass control device further comprises a control unit communicative with said bypass inlet and outlet valves and with an input signal source.

5. The electric power generation system of claim 4 wherein said control unit is a microcontroller.

6. The electric power generation system of claim 1 wherein one of said reactant stream passages is an oxidant flow passage.

7. The electric power generation system of claim 1 wherein one of said reactant stream passages is a fuel flow passage.

* * * * *